US 9,851,217 B2

(12) United States Patent
Nishibashi et al.

(10) Patent No.: US 9,851,217 B2
(45) Date of Patent: Dec. 26, 2017

(54) NAVIGATION DEVICE

(71) Applicant: Mitsubishi Electric Corporation, Tokyo (JP)

(72) Inventors: Kumi Nishibashi, Tokyo (JP); Takashi Irie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 132 days.

(21) Appl. No.: 15/056,045

(22) Filed: Feb. 29, 2016

(65) Prior Publication Data

US 2016/0178390 A1   Jun. 23, 2016

Related U.S. Application Data

(63) Continuation of application No. 14/608,832, filed on Jan. 29, 2015, now Pat. No. 9,341,496, which is a continuation of application No. 13/806,603, filed as application No. PCT/JP2010/004731 on Jul. 23, 2010, now Pat. No. 9,689,701.

(51) Int. Cl.
　　G08G 1/00　　(2006.01)
　　G01C 21/34　(2006.01)
　　G01C 21/26　(2006.01)
　　G01C 21/36　(2006.01)
　　G08G 1/0968　(2006.01)

(52) U.S. Cl.
　　CPC ......... *G01C 21/3658* (2013.01); *G01C 21/34* (2013.01); *G01C 21/3655* (2013.01); *G08G 1/096827* (2013.01); *G08G 1/096844* (2013.01); *G08G 1/096861* (2013.01)

(58) Field of Classification Search
CPC .......... G01C 21/36; G01C 21/34; G08G 1/00
See application file for complete search history.

(56) References Cited

U.S. PATENT DOCUMENTS 6,320,515 B1　11/2001　Olsson
6,594,580 B1　 7/2003　Tada et al.
　　　　　　　　(Continued)

FOREIGN PATENT DOCUMENTS

DE　　102008062206 A1　9/2009
JP　　　　8-313291 A　11/1996
　　　　　　　　(Continued)

*Primary Examiner* — Yonel Beaulieu
*Assistant Examiner* — Martin Weeks
(74) *Attorney, Agent, or Firm* — Birch, Stewart, Kolasch & Birch, LLP

(57) ABSTRACT

Disclosed is a navigation device which extracts an entrance and exit section which exists ahead of a vehicle and in which a vehicle is permitted to make a lane change between an HOV lane and a normal lane on the basis of information about the position of the vehicle and map data in which the HOV lane and the normal lane are defined by a single link, extracts a branch point on the HOV lane existing ahead of the vehicle on the basis of the map data and the position information, determines a guidance time for the extracted entrance and exit section, and another guidance time for the branch point, and provides guidance notifying that the vehicle can exit the HOV lane or guidance notifying that the vehicle can enter the HOV lane at the guidance time, or provides guidance on the branch at the other guidance time.

9 Claims, 20 Drawing Sheets

(56) References Cited

U.S. PATENT DOCUMENTS

| | | |
|---|---|---|
| 7,440,588 B2 | 10/2008 | Kaneko et al. |
| 9,562,787 B2 * | 2/2017 | Kojima .............. G01C 21/3658 |
| 2001/0021895 A1 | 9/2001 | Yamazaki |
| 2001/0049582 A1 | 12/2001 | Sakashita |
| 2005/0049779 A1 | 3/2005 | Yasuda et al. |
| 2007/0050134 A1 | 3/2007 | Hayashida et al. |
| 2008/0071465 A1 | 3/2008 | Chapman et al. |
| 2008/0288163 A1 | 11/2008 | Asano |
| 2009/0187335 A1 | 7/2009 | Muhlfelder et al. |
| 2009/0248294 A1 * | 10/2009 | Machino .......... G08G 1/096827 701/415 |
| 2010/0033571 A1 | 2/2010 | Fujita et al. |
| 2011/0166781 A1 | 7/2011 | Irie et al. |

FOREIGN PATENT DOCUMENTS

| | | |
|---|---|---|
| JP | 11-257992 A | 9/1999 |
| JP | 2000-266559 A | 9/2000 |
| JP | 2000-339580 A | 12/2000 |
| JP | 2001-183159 A | 7/2001 |
| JP | 2005-77126 A | 3/2005 |
| JP | 2007-86052 A | 4/2007 |
| JP | 3908425 B2 | 4/2007 |
| JP | 2007-115198 A | 5/2007 |
| JP | 2007-127598 A | 5/2007 |
| JP | 2007-315797 A | 12/2007 |
| JP | 2008-75496 A | 4/2008 |
| JP | 2008-241507 A | 10/2008 |
| WO | WO 2009/150784 A1 | 12/2009 |
| WO | WO 2010/061528 A1 | 6/2010 |
| WO | WO 2010/061553 A1 | 6/2010 |

* cited by examiner

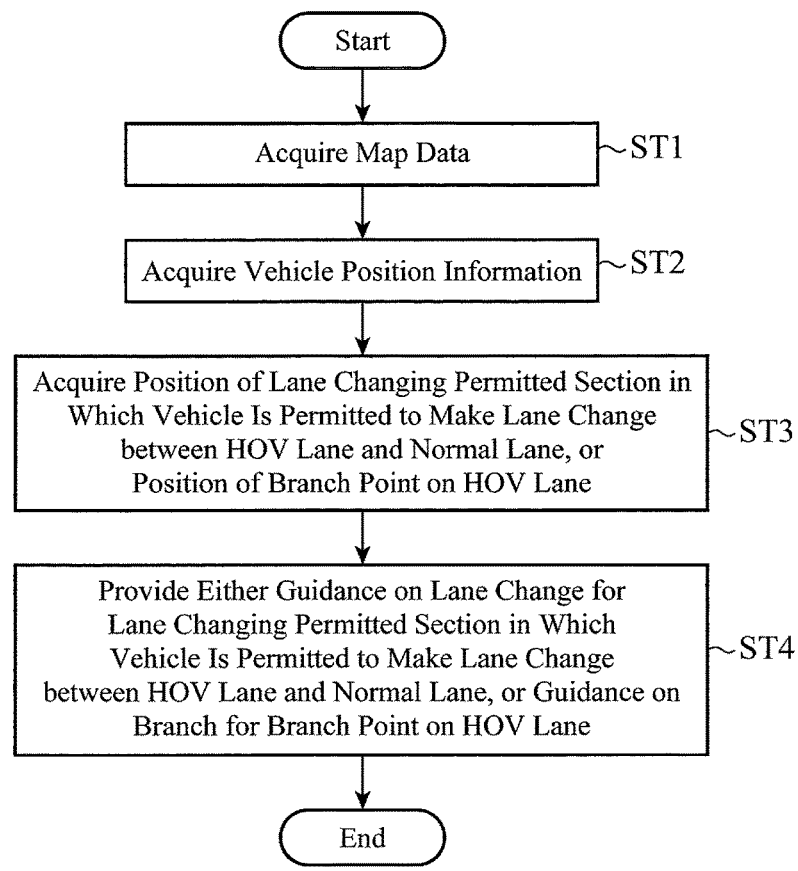
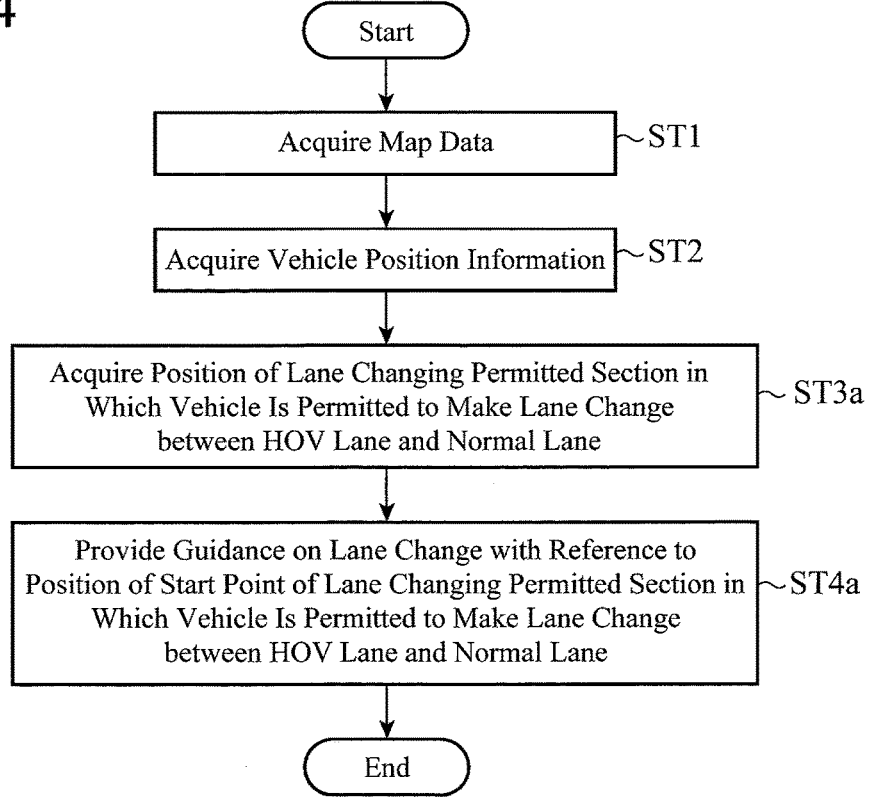

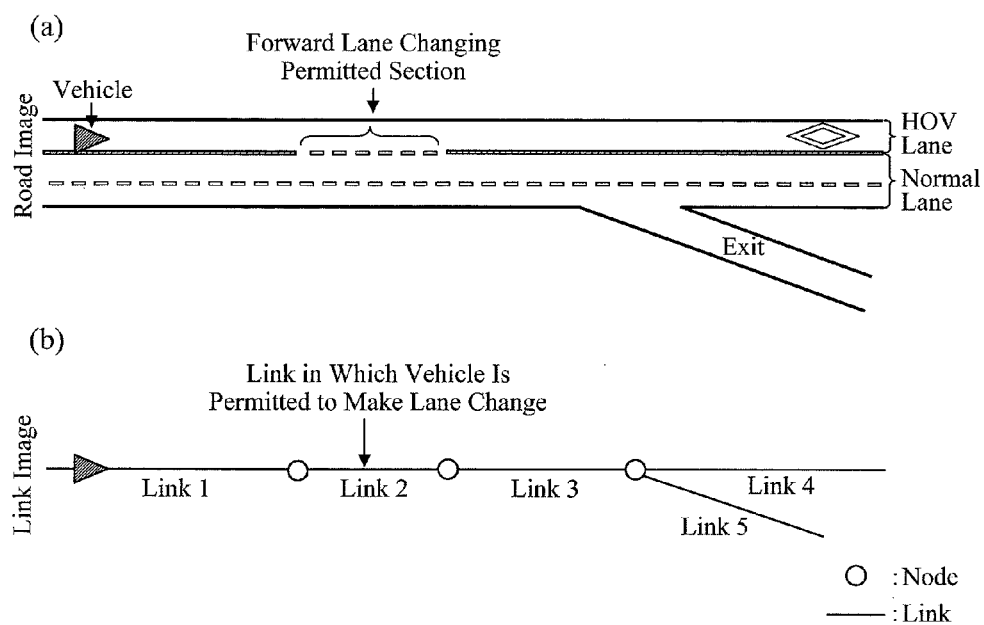

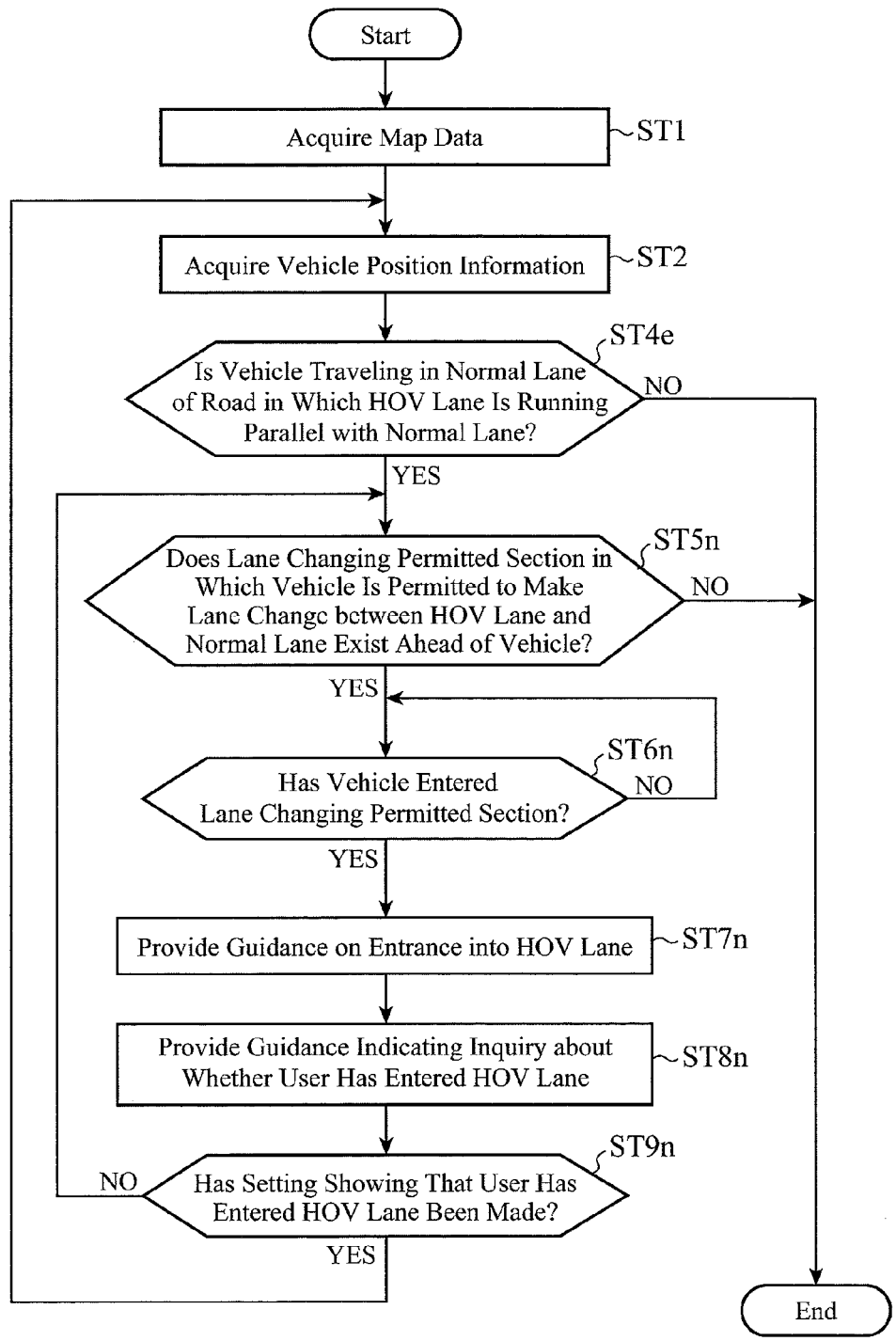

NAVIGATION DEVICE

CROSS REFERENCE TO RELATED APPLICATION

This application is a Continuation of U.S. application Ser. No. 14/608,832, filed on Jan. 29, 2015, now U.S. Pat. No. 9,341,496 which is a Continuation of U.S. application Ser. No. 13/806,603, filed on Dec. 21, 2012 now U.S. Pat. No. 9,689,701 as the National Phase under 35 U.S.C. §371 of International Application No. PCT/JP2010/004731 filed on Jul. 23, 2010, the contents of each of the aforementioned applications being hereby expressly incorporated by reference into the present application in their entirety.

FIELD OF THE INVENTION

The present invention relates to a vehicle-mounted navigation device for providing route guidance. More particularly, it relates to a technique of providing information related to HOV (High Occupancy Vehicle) lanes.

BACKGROUND OF THE INVENTION

Conventionally, an HOV lane or the like which is used in a road system mainly seen in, for example, a North American big city is known as a road on which restrictions showing which vehicles can enter the road are imposed. An HOV lane is also called a car pool lane and is a lane in which only vehicles with two or more people are allowed to travel. A lane disposed along with normal lanes on a highway, a lane which is a shortcut of an interchange, etc. are known as HOV lanes. A road system which adopts such an HOV lane provides the user with a preferential treatment that makes it possible to arrive at his or her destination in a shorter time as long as the user travels in an HOV lane so as to prod the user to share the vehicle with one or more other persons, thereby reducing the traffic as a whole and therefore reducing traffic jams.

As a technique related to such an HOV lane, patent reference 1 discloses a navigation device which searches for a route by using information about HOV lanes as road information about a route leading to a destination set up by the user. In this navigation device, map data including road information about entrance and exit points in a highway having an HOV lane are read from a DVD and are stored in a data buffer in order to enable the user to efficiently travel in a lane on which restrictions against lane changes for entrance into and exit from another lane are imposed. A route search processing unit carries out a route search process in consideration of the enable or disable of use of an HOV lane by using the map data stored in the data buffer. When providing route guidance using an HOV lane, an HOV lane guidance unit provides guidance on a certain lane change with an image and a voice at the time that an entrance or exit point at which the user's vehicle should change its traveling direction falls within a predetermined distance from the position of the vehicle.

RELATED ART DOCUMENT

Patent Reference

Patent reference 1: Japanese Unexamined Patent Application Publication No. 2001-183159

A problem is, however, that when providing guidance by using map data in which an HOV lane and a normal lane (a lane other than HOV lanes) are expressed by a single link, an appropriate guidance time, a guidance description, or the like for such a road cannot be presented.

The present invention is made in order to solve the problem, and it is therefore an object of the present invention to provide a navigation device which can provide appropriate guidance for the user all the time until the user reaches his or her destination even in a case of using map data in which an HOV lane and a normal lane are expressed by a single link.

SUMMARY OF THE INVENTION

In accordance with the present invention, there is provided a navigation device comprising a memory device that holds a computer program, and a processor that executes the computer program read out from the memory device, the computer program being configured to perform a process of: acquiring map data in which a single link represents a plurality of lanes of a road including at least one special lane and a plurality of normal lanes, the map data being a map data in which entrance and exit between a particular special lane of the at least one special lane and one of the normal lanes which is adjacent to the particular special lane are permitted only in a predetermined permitted section; extracting an entrance and exit section of the road which exists ahead of a vehicle and in which the vehicle is permitted to make a lane change between the particular special lane and the adjacent normal lane on a basis of the acquired map data and position information about the vehicle; extracting a branch point on the at least one special lane which exists ahead of the vehicle on a basis of the acquired map data and the position information about the vehicle; determining a guidance time for a lane changing permitted section defined by the extracted entrance and exit section, and another guidance time for the extracted branch point, both guidance times being determined such that a guidance time during travel on the at least one special lane is later than a guidance time during travel on the normal lanes; and providing, at the determined guidance time, exit guidance notifying that the vehicle is permitted to exit the particular special lane onto the adjacent normal lane or entrance guidance notifying that the vehicle is permitted to enter the particular special lane from the adjacent normal lane, or branch guidance on the branch point on the at least one special lane.

In accordance with the present invention, there is provided a navigation device comprising a memory device that holds a computer program, and a processor that executes the computer program read out from the memory device, the computer program being configured to perform a process of: acquiring map data in which a single link represents a plurality of lanes of a road including at least one special lane and a plurality of normal lanes, the map data being a map data in which entrance and exit between a particular special lane of the at least one special lane and one of the normal lanes which is adjacent to the particular special lane are permitted only in a predetermined permitted section; extracting an entrance and exit section which exists ahead of a vehicle and in which the vehicle is permitted to make a lane change between the particular special lane and the adjacent normal lane on a basis of the acquired map data and position information about the vehicle; extracting a branch point on the at least one special lane which exists ahead of the vehicle on a basis of the acquired map data and the position information about the vehicle; detecting a sign related to a special lane existing forwardly; determining a guidance time for a lane changing permitted section defined by the extracted entrance and exit section, and another guidance time for the extracted branch point according to a position of the detected sign or a distance to an exit displayed on said sign; and providing, at the determined guidance time, exit guidance notifying that the vehicle is permitted to exit the particular special lane onto the adjacent normal lane or entrance guidance notifying that the vehicle is permitted to enter the particular special lane from the adjacent normal lane, or branch guidance on the branch point on the at least one special lane.

In accordance with the present invention, there is provided a navigation device comprising a memory device that holds a computer program, and a processor that executes the computer program read out from the memory device, the computer program being configured to perform a process of: acquiring map data in which a single link represents a plurality of lanes of a road including at least one special lane and a plurality of normal lanes, the map data being a map data in which entrance and exit between a particular special lane of the at least one special lane and one of the normal lanes which is adjacent to the particular special lane are permitted only in a predetermined permitted section; extracting an entrance and exit section which exists ahead of a vehicle and in which the vehicle is permitted to make a lane change between the particular special lane and the adjacent normal lane on a basis of the acquired map data and position information about the vehicle; determining a guidance time for a start point of a lane changing permitted section defined by the entrance and exit section; and providing, at the determined guidance time during travel on the special lane, information about an exit of a highway which exists forwardly and which the vehicle will reach after exiting the particular special lane onto the adjacent normal lane by using at least one of a textual display, a beep sound, a guide map, and a voice indicating a street name.

The navigation device in accordance with the present invention can provide appropriate guidance for the user at an appropriate time all the time until the user reaches his or her destination even in a case of using the map data in which an HOV lane and a normal lane are expressed by a single link.

BRIEF DESCRIPTION OF THE FIGURES

FIG. 3 is a flowchart showing an operation of the navigation device in accordance with Embodiment 1 of the present invention;

FIG. 4 is a flow chart showing an operation of a navigation device in accordance with Embodiment 2 of the present invention;

FIG. 20 is a view showing a road image and a link image for explaining the operation of the navigation device in accordance with Embodiment 13 of the present invention;

FIG. 21 is a view showing destination sign information for explaining the operation of the navigation device in accordance with Embodiment 13 of the present invention;

FIG. 23 is a flow chart showing an operation when the user enters an HOV lane which is performed by the navigation device in accordance with Embodiment 14 of the present invention.

EMBODIMENTS OF THE INVENTION

Hereafter, the preferred embodiments of the present invention will be explained in detail with reference to the drawings.

Embodiment 1

A navigation device in accordance with Embodiment 1 of the present invention is constructed in such a way as to appropriately provide guidance at a time when a vehicle exits from an HOV lane by using map data in which an HOV lane and a normal lane are expressed by a single link. An HOV lane as mentioned above corresponds to a "special lane" in accordance with the present invention. A special lane is not limited to an HOV lane, and can alternatively consist of another lane on which restrictions against lane changes for entrance into and exit from a normal lane are imposed.

Figure 1:
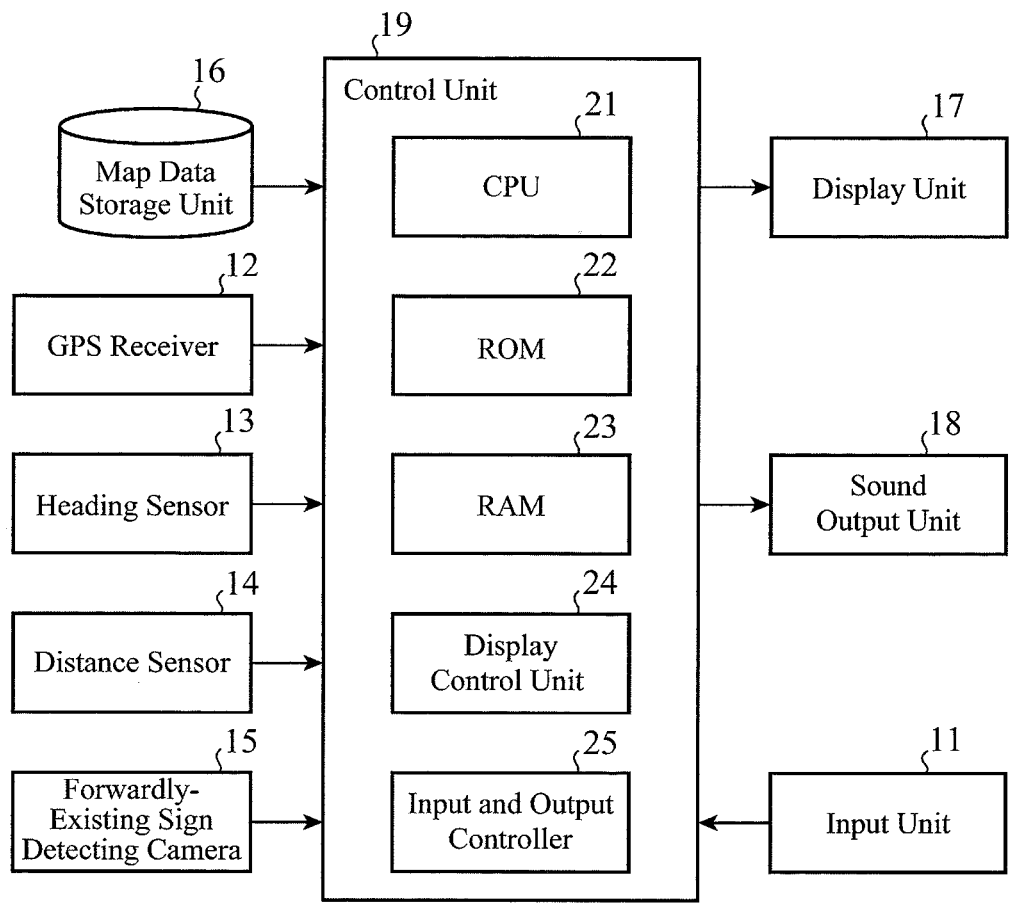
FIG. 1 is a block diagram showing the hardware configuration of a navigation device in accordance with Embodiment 1 of the present invention.

FIG. 1 is a block diagram showing the hardware configuration of a navigation device in accordance with Embodiment 1 of the present invention. This navigation device is provided with an input unit 11, a GPS (Global Positioning System) receiver 12, a heading sensor 13, a distance sensor 14, a forwardly-existing sign detecting camera 15, a map data storage unit 16, a display unit 17, a sound output unit 18, and a control unit 19.

The input unit 11 can be comprised of, for example, a touch panel placed on the screen of the display unit 17. This input unit 11 is used in order for a user to set a place of departure, a destination, a waypoint, or the like for a route search, and to provide one of various commands to the navigation device. Information inputted from this input unit 11 is sent to the control unit 19 as an operation signal.

The GPS receiver 12 detects the current position of a vehicle in which this navigation device is mounted on the basis of GPS signals received from GPS satellites not shown. The current position of the vehicle detected by this GPS receiver 12 is notified to the control unit 19 as a current position signal. The heading sensor 13 detects the heading toward which the vehicle is headed, and notifies this heading to the control unit 19 as a heading signal. The distance sensor 14 detects the travel distance traveled by the vehicle, and notifies this travel distance to the control unit 19 as a distance signal.

The forwardly-existing sign detecting camera 15 detects a sign on an HOV lane which exists ahead of the vehicle. The position of the sign and an image of the sign which are detected by this forwardly-existing sign detecting camera 15 (e.g. a character string or the like showing the distance to an exit displayed on the sign) are notified to the control unit 19 as a sign signal.

The map data storage unit 16 is comprised of, for example, an HDD (Hard Disk Drive) device, and stores various types of data for implementing a navigation function as well as digitized map data including road data about roads each of which is defined by links and nodes. The map data storage unit 16 is not limited to the HDD device, and can be alternatively comprised of a drive device for reading data from a DVD (Digital Versatile Disk) or a CD (Compact Disc) mounted thereto, a USB memory, or an SD card.

Roads shown by the road data include a road which is defined by a single link, and in which the vehicle is permitted to enter and exit an HOV lane which is one of a plurality of lanes from and to a normal lane which is one of the remaining lanes only in a predetermined permitted section. Link data showing links include HOV lane position information showing the positions of HOV lanes, HOV lane presence or absence information showing whether or not an HOV lane is running parallel with other lanes in each road, lane changing permitted section information showing sections in each of which the vehicle is permitted to make a lane change between an HOV lane and a normal lane, time regulation information showing whether or not the vehicle is permitted to pass through the entrances and exits of each HOV lane according to time of day, road names, and road numbers. The data stored in this map data storage unit 16 can be read by the control unit 19.

The display unit 17 is comprised of, for example, an LCD (Liquid Crystal Display), and displays a map, a route, an enlarged map, various guide messages, etc. on the screen thereof according to an image signal sent thereto from the control unit 19. The sound output unit 18 is comprised of, for example, a speaker, and outputs a guidance message either for an exit from an HOV lane to a normal lane or an entrance into an HOV lane from a normal lane by voice according to a voice signal sent thereto from the control unit 19.

The control unit 19 controls the whole of the navigation device, as will be mentioned in detail below. This control unit 19 is provided with a CPU (Central Processing Unit) 21, a ROM (Read Only Memory) 22, a RAM (Random Access Memory) 23, a display control unit 24, and an input and output controller 25.

The CPU 21 uses the RAM 23 as a work memory, and operates according to a program read from the ROM 22 to perform one of the various processes including a route search and extraction of guidance points. The ROM 22 stores programs and data which the CPU 21 reads to perform the various processes. The RAM 23 is used as the work memory of the CPU 21, as mentioned above, and temporarily stores data being arithmetic-processed (e.g. expanded map data).

The display control unit 24 controls the display unit 17. Concretely, the display control unit 24 converts display data generated by the CPU 21 into an image signal, and sends this image signal to the display unit 17 via the input and output controller 25. The input and output controller 25 functions as an interface between the control unit 19 and the input unit 11, the GPS receiver 12, the heading sensor 13, the distance sensor 14, the forwardly-existing sign detecting camera 15, the map data storage unit 16, the display unit 17, and the sound output unit 18 which are connected to the control unit 19, and controls transmission and reception of signals between the control unit and these components.

Figure 2:
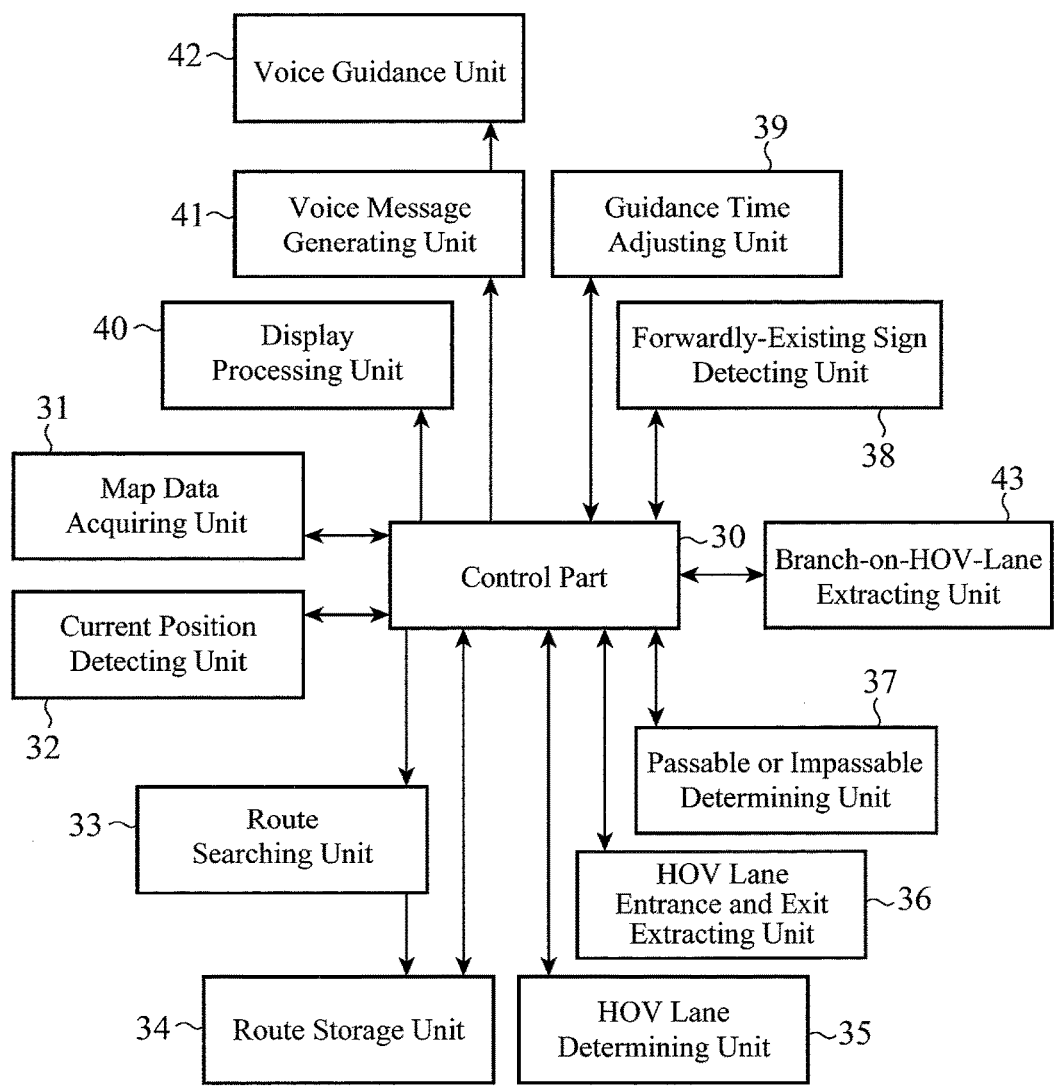
FIG. 2 is a functional block diagram showing the functional structure of a control unit which constructs the navigation device in accordance with Embodiment 1 of the present invention.

Next, the details of functions implemented by the control unit 19 will be explained. FIG. 2 is a functional block diagram showing the functional configuration of the control unit 19. The control unit 19 is provided with a control part 30, a map data acquiring unit 31, a current position detecting unit 32, a route searching unit 33, a route storage unit 34, an HOV lane determining unit 35, an HOV lane entrance and exit extracting unit 36, a passable or impassable determining unit 37, a forwardly-existing sign detecting unit 38, a guidance time adjusting unit 39, a display processing unit 40, a voice message generating unit 41, a voice guidance unit 42, and a branch-on-HOV-lane extracting unit 43. These components except the route storage unit 34 are implemented through program processes carried out by the CPU 21.

The control part 30 controls the whole of the control unit 19. For example, the control part 30 controls start and stop of each of the components connected thereto, and transmission and reception of data among these components. The map data acquiring unit 31 acquires map data from the map data storage unit 16, and sends these map data to the control part 30.

The current position detecting unit 32 detects the current position of the vehicle on the basis of both the current position signal sent thereto from the GPS receiver 12 or a current position signal which the current position detecting unit generates with dead reckoning by using the heading signal sent thereto from the heading sensor 13 and the distance signal sent thereto from the distance sensor 14, and the map data acquired from the map data acquiring unit 31 via the control part 30. Because transmission and reception of data among the components connected to the control part 30 are all carried out via the control part 30, a description of the process of carrying out transmission and reception of data via the control part 30 will be omitted hereafter in some cases.

Even though the vehicle is traveling a road expressed by a single link on map data, the current position detecting unit 32 can detect in which lane shown by the single link the vehicle is actually traveling. The current position of the vehicle detected by this current position detecting unit 32 is notified to the control part 30 as current position data.

The route searching unit 33 searches for a route from either the current position shown by the vehicle position information sent thereto from the current position detecting unit 32 or the place of departure inputted thereto from the input unit 11, to the destination inputted thereto from the input unit 11 on the basis of the map data acquired by the map data acquiring unit 31. The route which this route searching unit 33 has searched for is notified to the route storage unit 34 as route data.

The route storage unit 34 is disposed in, for example, a part of the RAM 23 included in the control unit 19, and stores the route data sent thereto from the route searching unit 33.

The route data stored in this route storage unit 34 can be read by the control part 30.

The HOV lane determining unit 35 determines whether or not an HOV lane is included in either the road included in the map data acquired by the map data acquiring unit 31 or the route shown by the route data stored in the route storage unit 34. The result of the determination acquired by this HOV lane determining unit 35 is sent to the control part 30.

The HOV lane entrance and exit extracting unit 36 corresponds to an "entrance and exit extracting unit" in accordance with the present invention. When the result of the determination sent thereto via the control part 30 from the HOV lane determining unit 35 shows that an HOV lane is included in the road or the route, the HOV lane entrance and exit extracting unit extracts an entrance and exit section in which the vehicle is permitted to make a lane change between a normal lane and the HOV lane. This entrance and exit section defines a lane changing permitted section. The entrance and exit section extracted by this HOV lane entrance and exit extracting unit 36 is notified to the control part 30 as entrance and exit position data.

The passable or impassable determining unit 37 determines whether the vehicle can pass through the HOV lane in the road or the route which the HOV lane determining unit 35 has determined includes the HOV lane on the basis of both the number of passengers shown by number-of-passengers data sent thereto from a number-of-passengers detecting unit (not shown in the figure), and vehicle information sent thereto from a vehicle information extracting unit (not shown in the figure). The result of the determination acquired by this passable or impassable determining unit 37 is sent to the control part 30.

The forwardly-existing sign detecting unit 38 detects whether or not there exists a sign, and a character string showing the position of the sign and the information written on the sign (the distance to an exit or the name of the exit displayed on the sign) on the basis of the sign signal sent thereto from the forwardly-existing sign detecting camera 15, and sends the results of the detection to the control part 30 as sign data.

The guidance time adjusting unit 39 adjusts a guidance time on the basis of information showing that the current position has been determined to be a position where a guidance has to be provided from both the current position detected by the current position detecting unit 32 and the route shown by the route data stored in the route storage unit 34, pieces of HOV lane related information acquired from the HOV lane determining unit 35, the HOV lane entrance and exit extracting unit 36, and the passable or impassable determining unit 37, the information acquired from the forwardly-existing sign detecting unit 38, and so on. When determining that the guidance time has come, the guidance time adjusting unit sends guidance time data showing that the guidance time has come to the display processing unit 40 and to the voice message generating unit 41 via the control part 30.

When the guidance time data are sent thereto from the guidance time adjusting unit 39, the display processing unit 40 generates display data for displaying the map shown by the map data from the map data acquiring unit 31, the route shown by the route data from the route storage unit 34, and the pieces of information about the guidance point acquired from the results of the processes carried out by the HOV lane determining unit 35, the HOV lane entrance and exit extracting unit 36, the passable or impassable determining unit 37, and the forwardly-existing sign detecting unit 38. The display data generated by this display processing unit 40 are sent to the display control unit 24 disposed in the control unit 19.

When the guidance time data are sent thereto from the guidance time adjusting unit 39, the voice message generating unit 41 generates a voice message for providing guidance on the route shown by the route data from the route storage unit 34, and the pieces of information about the guidance point acquired from the results of the processes carried out by the HOV lane determining unit 35, the HOV lane entrance and exit extracting unit 36, the passable or impassable determining unit 37, and the forwardly-existing sign detecting unit 38. The voice message generated by this voice message generating unit 41 is sent to the voice guidance unit 42 as voice data.

The voice guidance unit 42 converts the voice data sent thereto from the voice message generating unit 41 into a voice signal, and sends this voice signal to the sound output unit 18. As a result, voice guidance corresponding to the voice message is outputted from the sound output unit 18.

The branch-on-HOV-lane extracting unit (branch extracting unit) 43 extracts a branch point on the HOV lane which exists ahead of the vehicle on the basis of both the map data acquired by the map data acquiring unit 31 and the current position of the vehicle detected by the current position detecting unit 32. The result of the extraction of a branch on the HOV lane acquired by the branch-on-HOV-lane extracting unit 43 is sent to the control part 30.

Next, an operation of the navigation device will be explained. FIG. 3 is a flow chart showing an operation of the navigation device in accordance with Embodiment 1. An explanation of a guiding process of providing guidance on a lane change between an HOV lane and a normal lane will be made. When the guiding process is started, map data are acquired first (step ST1). More specifically, the map data acquiring unit 31 acquires map data from the map data storage unit 16, and sends the map data to the current position detecting unit 32 and to the HOV lane determining unit 35.

Vehicle position information is then acquired (step ST2). More specifically, the current position detecting unit 32 detects the current position of the vehicle on the basis of either the current position signal sent thereto from the GPS receiver 12 or a current position signal which the current position detecting unit generates with dead reckoning by using the heading signal sent thereto from the heading sensor 13 and the distance signal sent thereto from the distance sensor 14, and the map data acquired from the map data processing unit 31, and notifies the current position of the vehicle to the control part 30 as vehicle position information. At this time, the HOV lane determining unit 35 determines whether or not an HOV lane is included in either the road included in the map data acquired by the map data acquiring unit 31 or the route shown by the route data stored in the route storage unit 34, and sends the result of the determination acquired thereby to the control part 30.

After that, the position of a lane changing permitted section in which the vehicle is permitted to make a lane change between the HOV lane and a normal lane or the position of a branch point on the HOV lane is acquired (step ST3). More specifically, when the result of the determination carried out by the HOV lane determining unit 35 sent thereto from the control part 30 shows that an HOV lane is included in the road, the HOV lane entrance and exit extracting unit 36 extracts an entrance and exit section which exists ahead of the vehicle, and in which the vehicle is permitted to make a lane change between a normal lane and the HOV lane, and notifies the entrance and exit section to the control part 30 as entrance and exit position data. The control part 30 acquires the section shown by the entrance and exit position data sent thereto from the HOV lane entrance and exit extracting unit 36 as a lane changing permitted section. As an alternative, when the result of the determination carried out by the HOV lane determining unit 35 sent thereto from the control part 30 shows that an HOV lane is included in the road, the branch-on-HOV-lane extracting unit 43 extracts a branch point on the HOV lane which exists ahead of the vehicle, and notifies the branch point to the control part 30 as branch point position data. The control part 30 acquires the position shown by the branch point position data sent thereto from the branch-on-HOV-lane extracting unit 43 as a branch point on the HOV lane.

Then, guidance on either a lane change for the lane changing permitted section in which the vehicle is permitted to make a lane change between the HOV lane and a normal lane, or a branch for the branch point on the HOV lane is provided (step ST4). More specifically, the control part 30 provides guidance on either a lane change in the lane changing permitted section acquired in step ST3 or a branch at the branch point on the HOV lane acquired in step ST3. More specifically, the control part provides either exit guidance notifying that the vehicle can exit the HOV lane or entrance guidance notifying that the vehicle can enter the HOV lane, or branch guidance notifying that there is a branch on the HOV lane for the user.

As previously explained, because the navigation device in accordance with the present invention can provide either exit guidance notifying that the vehicle can exit an HOV lane or entrance guidance notifying that the vehicle can enter an HOV lane, or branch guidance notifying that there is a branch on an HOV lane for the user, the navigation device in accordance with the present invention can provide either the exit guidance notifying that the vehicle can exit an HOV lane into a normal lane or the entrance guidance notifying that the vehicle can enter an HOV lane from a normal lane, or the branch guidance notifying that there is a branch on an HOV lane for the user when the vehicle reaches a position appropriate for providing the guidance.

Embodiment 2

A navigation device in accordance with Embodiment 2 of the present invention is constructed in such a way as to provide guidance on a lane change between an HOV lane and a normal lane with reference to the position of a start point of a lane changing permitted section in which a vehicle is permitted to make a lane change between the HOV lane and the normal lane. The navigation device in accordance with Embodiment 2 of the present invention has the same structure as that of the navigation device in accordance with Embodiment 1 shown in FIGS. 1 and 2.

FIG. 4 is a flow chart showing an operation of the navigation device in accordance with Embodiment 2 of the present invention, focusing on a guiding process. Hereafter, steps in each of which the same process in a corresponding step shown in the flow chart of FIG. 3 is carried out are designated by the same reference characters as those shown in FIG. 3, and the explanation of the steps will be simplified. When the guiding process is started, map data are acquired first (step ST1). Vehicle position information is then acquired (step ST2).

The position of a lane changing permitted section in which the vehicle is permitted to make a lane change between an HOV lane and a normal lane is then acquired (step ST3a). More specifically, when the result of determination sent from an HOV lane determining unit 35 shows that an HOV lane is included in the road, an HOV lane entrance and exit extracting unit 36 extracts an entrance and exit section which exists ahead of the vehicle, and in which the vehicle is permitted to make a lane change between a normal lane and the HOV lane, and notifies the entrance and exit section to a control part 30 as entrance and exit position data. The control part 30 acquires the section shown by the entrance and exit position data sent thereto from the HOV lane entrance and exit extracting unit 36 as a lane changing permitted section. As an alternative, when the result of the determination carried out by the HOV lane determining unit 35 sent thereto from the control part 30 shows that an HOV lane is included in the road, a branch-on-HOV-lane extracting unit 43 extracts a branch point on the HOV lane which exists ahead of the vehicle, and notifies the branch point to the control part 30 as branch point position data. The control part 30 also acquires the position shown by the branch point position data sent thereto from the branch-on-HOV-lane extracting unit 43 as a branch point on the HOV lane.

Figure 5:
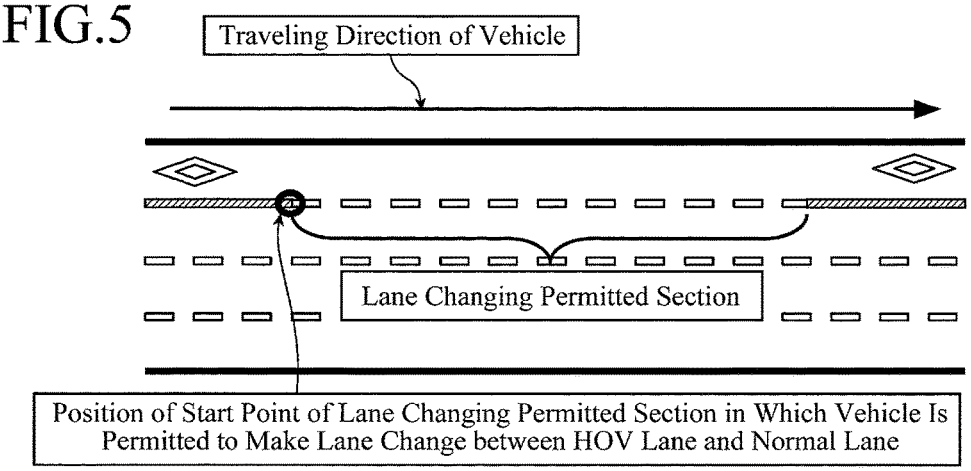
FIG. 5 is a view for explaining an operation of the navigation device in accordance with Embodiment 2 of the present invention.

Then, guidance on a lane change is provided with reference to the position of the start point of the lane changing permitted section in which the vehicle is permitted to make a lane change between the HOV lane and a normal lane (step ST4a). More specifically, the control part 30 provides guidance on a lane change with reference to the position of the start point of the lane changing permitted section acquired in step ST3a. In this case, the position of the start point of the lane changing permitted section indicates the start point of a section, as shown in FIG. 5, in which the vehicle is permitted to go back and forth between the HOV lane and the normal lane. As an alternative, the control part 30 provides guidance on the branch point on the HOV lane with reference to the position of the branch point on the HOV lane acquired in step ST3a. After that, the navigation device ends the guiding process.

As previously explained, the navigation device in accordance with Embodiment 2 of the present invention can set up an effective guidance reference point when providing guidance on a lane changing permitted section whether at the time of providing no route guidance or at the time of providing route guidance. Because there is actually provided a sign at the start point of a lane changing permitted section in which the vehicle is permitted to make a lane change between an HOV lane and a normal lane, and the navigation device in accordance with Embodiment 2 of the present invention provides guidance on the lane changing permitted section when the vehicle reaches the start point, the navigation device enables the user to afford to make a lane change to enter or exit the HOV lane, thereby enabling the user to drive the vehicle with safety. In addition, the present embodiment is effective also for guidance on a branch point on an HOV lane.

Embodiment 3

A navigation device in accordance with Embodiment 3 of the present invention is constructed in such a way as to determine a reference point with reference to which to provide guidance according to the length of a lane changing permitted section. The structure of the navigation device in accordance with this Embodiment 4 is the same as that of the navigation device in accordance with Embodiment 1 shown in FIGS. 1 and 2.

Figure 6:
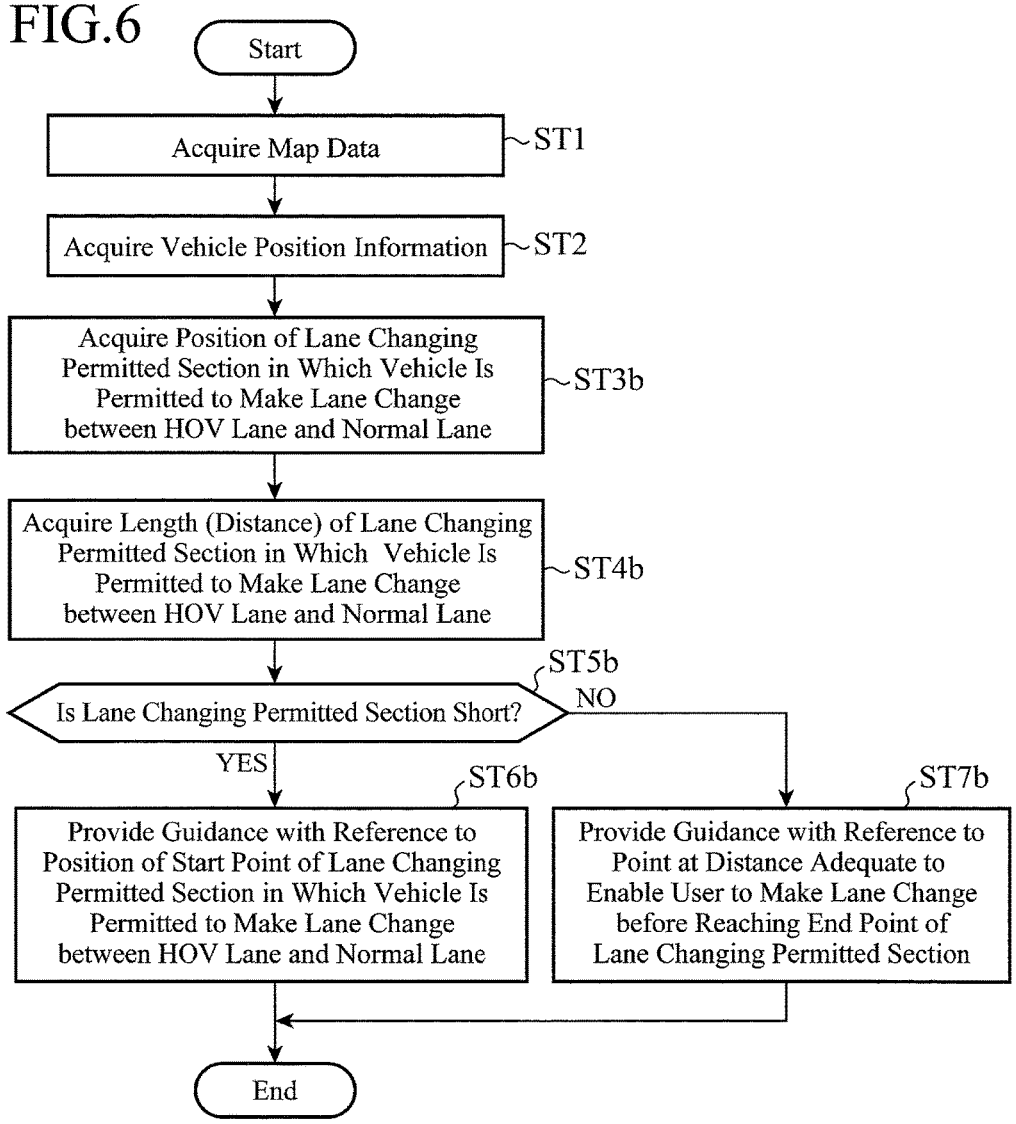
FIG. 6 is a flow chart showing an operation of a navigation device in accordance with Embodiment 3 of the present invention.

FIG. 6 is a flow chart showing an operation of the navigation device in accordance with Embodiment 3, focusing on a guiding process. Hereafter, steps in each of which the same process in a corresponding step shown in the flow chart of FIG. 3 is carried out are designated by the same reference characters as those shown in FIG. 3, and the explanation of the steps will be simplified.

When the guiding process is started, map data are acquired first (step ST1). Vehicle position information is then acquired (step ST2). The position of a lane changing permitted section in which a vehicle is permitted to make a lane change between an HOV lane and a normal lane is then acquired (step ST3*b*). The length (distance) of the lane changing permitted section is then acquired from the position of the lane changing permitted section acquired in step ST3*b* (step ST4*b*). More specifically, a control part 30 acquires the length of the section shown by entrance and exit position data sent thereto from an HOV lane entrance and exit extracting unit 36 as the length of the lane changing permitted section.

It is then checked to see whether or not the lane changing permitted section is short (step ST5*b*). Concretely, it is checked to see whether or not the distance of the lane changing permitted section acquired in step ST4*b* is shorter than, for example, 0.6 miles. When it is determined in this step ST5*b* that the lane changing permitted section is short, guidance is provided with reference to the position of the start point of the lane changing permitted section in which the vehicle is permitted to make a lane change between the HOV lane and the normal lane (step ST6*b*). More specifically, the control part 30 provides guidance on a lane change between the HOV lane and the normal lane with reference to the position of the start point. After that, the control part ends the guiding process.

In contrast, when it is determined in above-mentioned step ST5*b* that the lane changing permitted section is not short, guidance is provided with reference to a point at a distance (e.g. 0.6 miles) adequate to enable the user to make a lane change before reaching the end point of the lane changing permitted section (step ST7*b*). More specifically, the control part 30 provides guidance on a lane change between the HOV lane and the normal lane with reference to the point. After that, the control part ends the guiding process.

As previously explained, the navigation device in accordance with Embodiment 3 of the present invention can carry out provide guidance on exit from an HOV lane at a point appropriate for the user in consideration of the length of a lane changing permitted section in which the vehicle is permitted to make a lane change between the HOV lane and a normal lane whether at the time of providing no route guidance or at the time of providing route guidance. In this embodiment, as an example of a point appropriate for the user, when the lane changing permitted section is short, the start point of the lane changing permitted section can be defined, whereas when the lane changing permitted section is long, a point at an adequate distance provided in order to enable the user to make a lane change with safety before reaching the end point of the lane changing permitted section can be defined.

Once the user starts traveling in an HOV lane, the user usually wants to continue traveling in the HOV lane as long as possible until exiting the HOV lane, but the user desires to exit the HOV lane with safety. In order to respond these demands of users, the navigation device in accordance with Embodiment 3 provides guidance on a lane change in a lane changing permitted section at a point which the navigation device determines in consideration of the distance of the lane changing permitted section and a distance at which the user can make a lane change in the lane changing permitted section with safety. As a result, the navigation device enables the user to travel in an HOV lane as long as possible with safety.

Embodiment 4

A navigation device in accordance with Embodiment 4 of the present invention is constructed in such a way as to determine a reference point with reference to which to provide guidance according to the length of a lane changing permitted section to provide different guidance according to the reference point. The structure of the navigation device in accordance with this Embodiment 4 is the same as that of the navigation device in accordance with Embodiment 1 shown in FIGS. 1 and 2.

Figure 7:
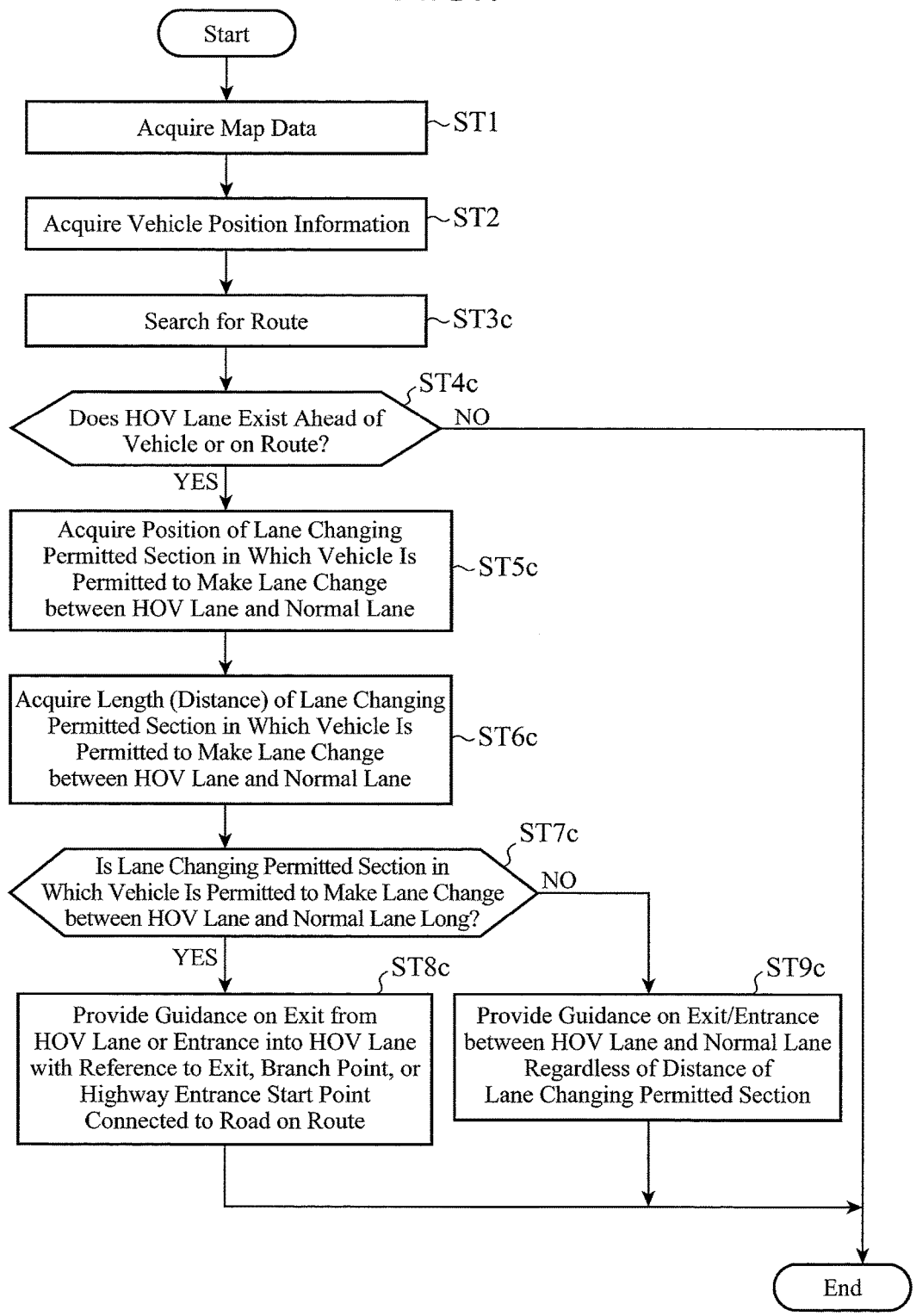
FIG. 7 is a flow chart showing an operation of a navigation device in accordance with Embodiment 4 of the present invention.

FIG. 7 is a flow chart showing an operation of the navigation device in accordance with Embodiment 4, focusing on a guiding process. Hereafter, steps in each of which the same process in a corresponding step shown in the flow chart of FIG. 3 is carried out are designated by the same reference characters as those shown in FIG. 3, and the explanation of the steps will be simplified.

When the guiding process is started, map data are acquired first (step ST1). Vehicle position information is then acquired (step ST2). A route search is then carried out (step ST3*c*). More specifically, a route searching unit 33 searches for a route leading from the current position of a vehicle shown by the vehicle position information acquired from a current position detecting unit 32 in step ST2 to a destination inputted from an input unit 11 on the basis of the map data acquired from a map data acquiring unit 31 in step ST1, and sends route data showing the route acquired through this search to a route storage unit 34 to make this route storage unit store the route data. The process of this step ST3*c* is skipped at the time of providing no route guidance (when not providing any guidance when the vehicle is traveling along the route).

It is then checked to see whether an HOV lane exists ahead of the vehicle or on the route (step ST4*c*). More specifically, an HOV lane determining unit 35 determines whether or not an HOV lane is included in either the road included in the map data acquired from the map data acquiring unit 31 in step ST1 or the route shown by the route data stored in the route storage unit 34 in step ST3*c*, and then sends the result of this determination to a control part 30.

The determination of whether or not an HOV lane is included in the route is effective only when the route searching process of step ST3c is carried out. The control part 30 checks to see whether or not an HOV lane exists ahead of the vehicle or on the route on the basis of the result of the determination acquired by the HOV lane determining unit 35. When it is determined in step ST4c that no HOV lane exists ahead of the vehicle or no HOV lane exists on the route, the navigation device ends the guiding process.

In contrast, when it is determined in step ST4c that an HOV lane exists ahead of the vehicle or on the route, the position of a lane changing permitted section in which the vehicle is permitted to make a lane change between the HOV lane and a normal lane is then acquired (step ST5c). The length (distance) of the lane changing permitted section in which the vehicle is permitted to make a lane change between the HOV lane and the normal lane is then acquired (step ST6c). It is then checked to see whether or not the lane changing permitted section in which the vehicle is permitted to make a lane change between the HOV lane and the normal lane is long (step ST7c). More specifically, the control part 30 checks to see whether or not the distance of the lane changing permitted section acquired in step ST6c is equal to or longer than 3 miles.

Figure 8:
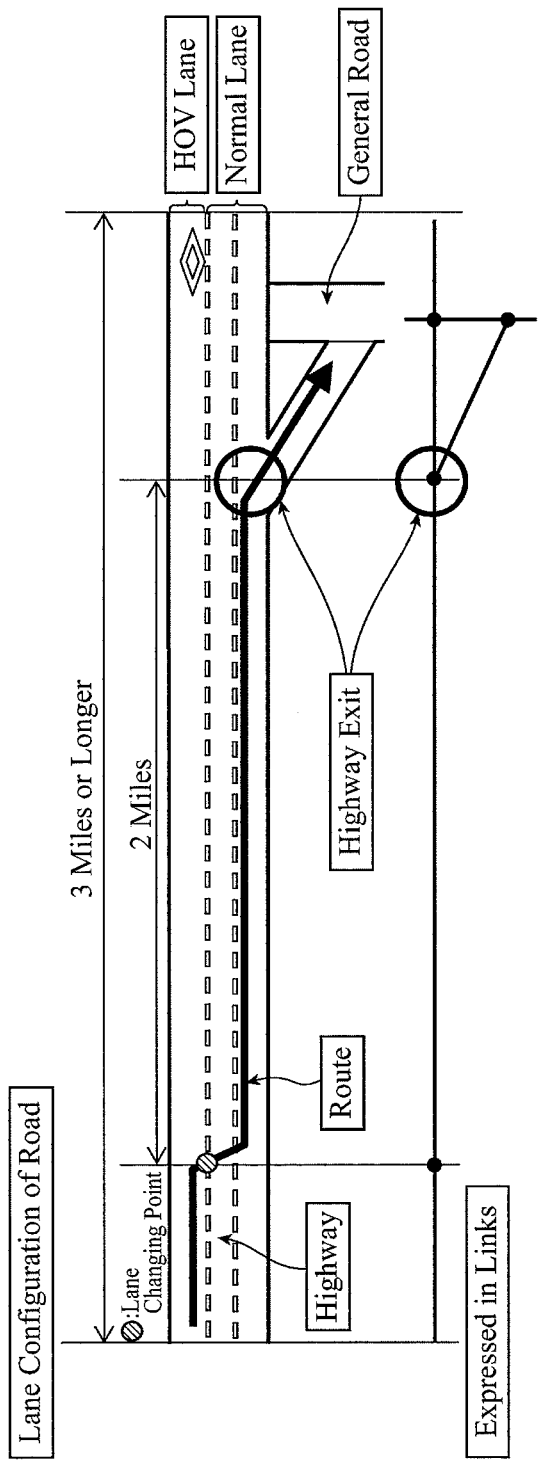
FIG. 8 is an explanatory drawing for explaining an operation of providing guidance with reference to a highway exit which is performed by the navigation device in accordance with Embodiment 4 of the present invention when the user exits an HOV lane.
Figure 9:
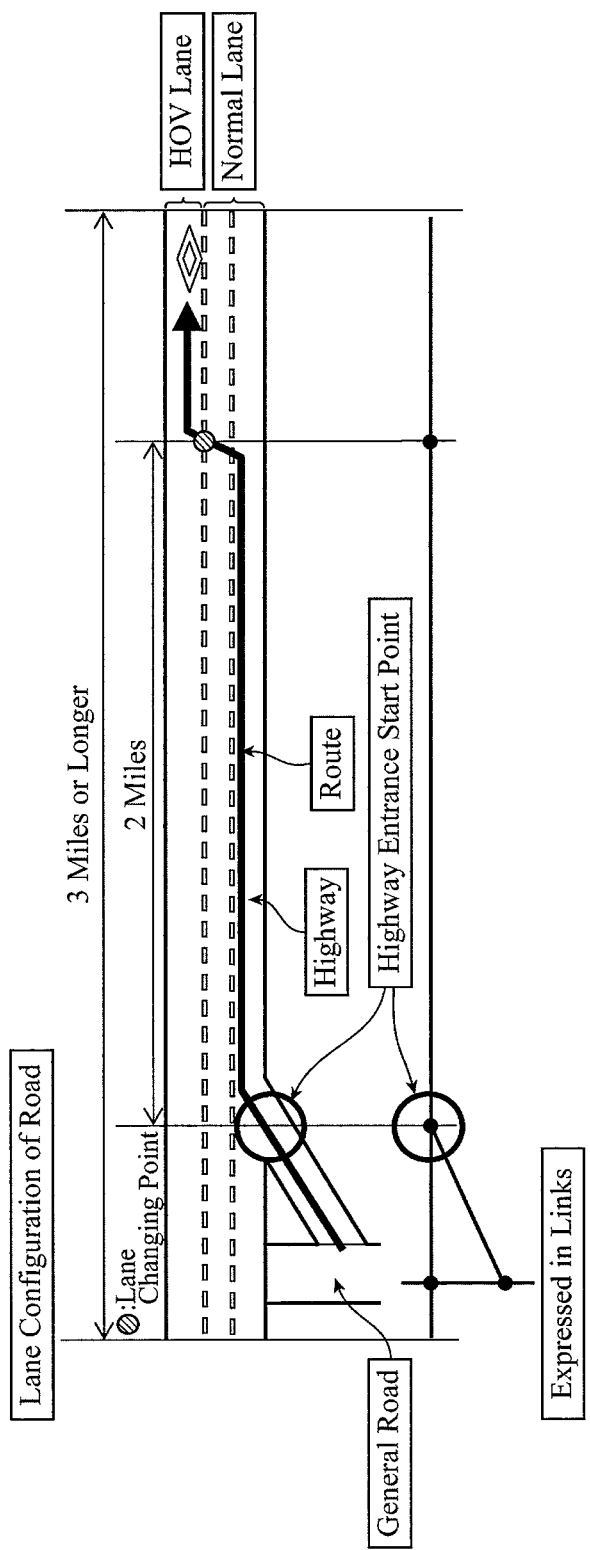
FIG. 9 is an explanatory drawing for explaining an operation of providing guidance with reference to a highway entrance start point which is performed by the navigation device in accordance with Embodiment 4 of the present invention when the user enters an HOV lane.

When it is determined in this step ST7c that the lane changing permitted section in which the vehicle is permitted to make a lane change between the HOV lane and the normal lane is long, guidance on exit from the HOV lane or entrance into the HOV lane is provided with reference to an exit, a branch point, or a highway entrance start point connected to the road on the route (step ST8c). More specifically, the control part 30 provides guidance on exit from the HOV lane or entrance into the HOV lane with reference to either a branch point, such as a highway exit on the route, or a highway entrance start point where vehicles traveling from a general road enters the highway, instead of the start point of the lane changing permitted section in which the vehicle is permitted to make a lane change between the HOV lane and the normal lane, or the like. FIGS. 8 and 9 show examples in which there is a long lane changing permitted section in which the vehicle is permitted to make a lane change between an HOV lane and a normal lane. An exit from an HOV lane with reference to a highway exit is considered in the example shown in FIG. 8, while entrance into an HOV lane with reference to a highway entrance start point is considered in the example shown in FIG. 9. After that, the navigation device ends the guiding process.

In contrast, when it is determined in above-mentioned step ST7c that the lane changing permitted section in which the vehicle is permitted to make a lane change between the HOV lane and the normal lane is not long, guidance on exit/entrance between the HOV lane and the normal lane is provided regardless of the distance of the lane changing permitted section (step ST9c). After that, the navigation device ends the guiding process.

As explained above, the navigation device in accordance with Embodiment 4 of the present invention can provide guidance on exit from an HOV lane with reference to an exit or a branch point on the route when the vehicle reaches a point appropriate for the user. In this embodiment, as an example of a point appropriate for the user, a point located in a direction of a place of departure (in a direction of the vehicle) with respect to the position of an exit on the route and at a distance adequate to enable the user to make a lane change, or a point located in a direction of the place of departure (in a direction of the vehicle) with respect to the position of a branch and at a distance adequate to enable the user to make a lane change can be defined.

Once the user starts traveling in an HOV lane, the user usually wants to continue traveling in the HOV lane as long as possible until exiting the HOV lane, but the user desires to exit the HOV lane with safety. In order to respond these demands of users, the navigation device in accordance with Embodiment 4 provides guidance on a lane change with reference to a branch or an exit existing ahead of an HOV lane which the vehicle will exit. As a result, the navigation device enables the user to travel in an HOV lane as long as possible with safety.

Further, the navigation device in accordance with Embodiment 4 of the present invention provides guidance on entrance into an HOV lane with reference to a highway entrance start point when the vehicle reaches a point appropriate for the user. In this case, as an example of a point appropriate for the user, a point located in a direction of a destination (in a direction of the heading of the vehicle) with respect to the position of a highway entrance start point on the route and at a distance adequate to enable the user to make a lane change can be defined.

In order to enable the user to enter an HOV lane with safety when the user desires to enter the HOV lane, instead of immediately providing guidance on entrance into the HOV lane at a highway entrance start point, the navigation device provides guidance by taking into consideration a distance in a direction of the destination with respect to the position of the highway entrance start point and adequate to enable the user to make a lane change from a normal lane when entering the HOV lane. As a result, the navigation device enables the user to start traveling in an HOV lane as early as possible with safety.

Because a typical road in which an HOV lane is disposed has a large number of normal lanes, and it is therefore difficult for the user to easily make lane changes to a lane which is next to the HOV lane, it is necessary to define a distance where the user can make a lane change in the normal lanes with safety as the distance adequate to enable the user to make a lane change.

Embodiment 5

A navigation device in accordance with Embodiment 5 of the present invention is constructed in such a way as not to provide any guidance on exit/entrance between an HOV lane and a normal lane in a lane changing permitted section in which a vehicle is permitted to make a lane change between the HOV lane and the normal lane when the lane changing permitted section is long. The structure of the navigation device in accordance with this Embodiment 5 is the same as that of the navigation device in accordance with Embodiment 1 shown in FIGS. 1 and 2.

Figure 10:
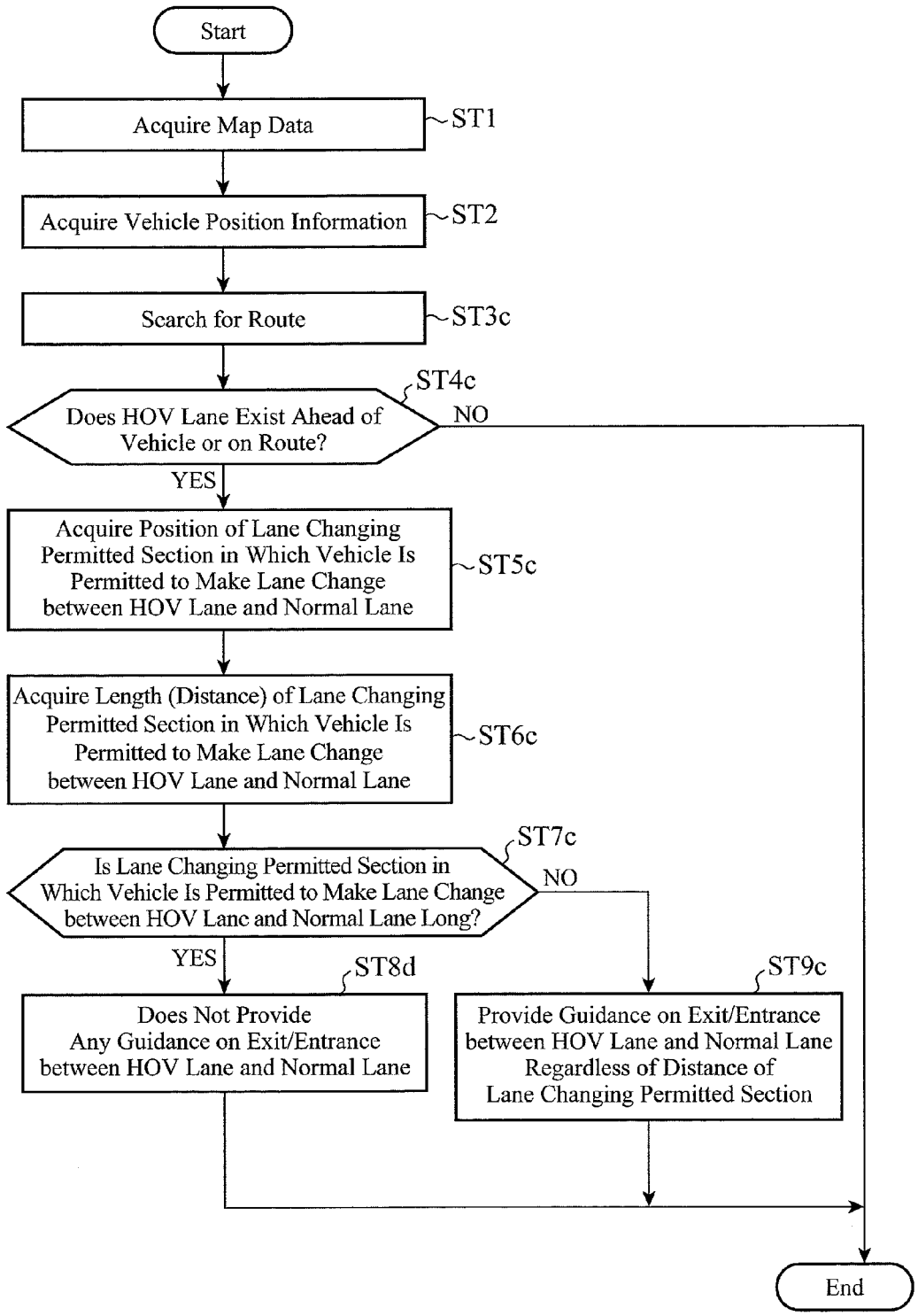
FIG. 10 is a flow chart showing an operation of a navigation device in accordance with Embodiment 5 of the present invention.

FIG. 10 is a flow chart showing an operation of the navigation device in accordance with Embodiment 5, focusing on a guiding process. Hereafter, steps in each of which the same process in a corresponding step shown in the flow chart of FIG. 7 is carried out are designated by the same reference characters as those shown in FIG. 7, and the explanation of the steps will be simplified.

When the guiding process is started, map data are acquired first (step ST1). Vehicle position information is then acquired (step ST2). A route search is then carried out (step ST3c). It is then checked to see whether an HOV lane exists ahead of a vehicle or on a route (step ST4c). When it is determined in this step ST4c that no HOV lane exists ahead of the vehicle or no HOV lane exists on the route, the navigation device ends the guiding process.

In contrast, when it is determined in step ST4c that an HOV lane exists ahead of the vehicle or on the route, the position of a lane changing permitted section in which the vehicle is permitted to make a lane change between the HOV lane and a normal lane is then acquired (step ST5c). The length (distance) of the lane changing permitted section in which the vehicle is permitted to make a lane change between the HOV lane and the normal lane is then acquired (step ST6c).

It is then checked to see whether or not the lane changing permitted section in which the vehicle is permitted to make a lane change between the HOV lane and the normal lane is long (step ST7c). Concretely, whether or not the distance of the lane changing permitted section acquired in step ST6c is equal to or longer than 3 miles is checked to see. In this case, "the lane changing permitted section is long" means that the HOV lane and the normal lane are separated by a white dotted line along the whole road, and the vehicle is permitted to make a lane change for exit/entrance between the HOV lane and the normal lane at an arbitrary position in the lane changing permitted section.

When it is determined in step ST7c that the lane changing permitted section in which the vehicle is permitted to make a lane change between the HOV lane and the normal lane is long, no guidance on exit/entrance between the HOV lane and the normal lane is provided (step ST8d). More specifically, because the vehicle can make a lane change at an arbitrary position between the HOV lane and the normal lane when the lane changing permitted section in which the vehicle is permitted to make a lane change between the HOV lane and the normal lane is long, the navigation device does not necessarily have to provide any guidance. Therefore, no guidance on exit/entrance between the HOV lane and the normal lane is provided. The navigation device can be constructed in such a way as not to, in this step ST8d, provide only any guidance on exit, only any guidance on entrance, or both any guidance on exit and any guidance on entrance. After that, the navigation device ends the guiding process.

In contrast, when it is determined in above-mentioned step ST7c that the lane changing permitted section in which the vehicle is permitted to make a lane change between the HOV lane and the normal lane is not long, guidance on exit/entrance between the HOV lane and the normal lane is provided regardless of the distance of the lane changing permitted section in which the vehicle is permitted to make a lane change between the HOV lane and the normal lane (step ST9c). After that, the navigation device ends the guiding process.

As previously explained, when the user can freely make a lane change between an HOV lane and a normal lane, the navigation device in accordance with Embodiment 5 of the present invention enables the user to make a lane change according to the user's liking, like in a case in which the user makes a lane change between normal lanes. Therefore, the navigation device can prevent any guidance from being provided uselessly for the user.

Embodiment 6

A navigation device in accordance with Embodiment 6 of the present invention is constructed in such a way as to determine whether or not to provide guidance on exit/entrance between an HOV lane and a normal lane in a lane changing permitted section in which a vehicle is permitted to make a lane change between the HOV lane and the normal lane according to a setting made by the user when the lane changing permitted section is long. The structure of the navigation device in accordance with this Embodiment 6 is the same as that of the navigation device in accordance with Embodiment 1 shown in FIGS. 1 and 2.

Figure 11:
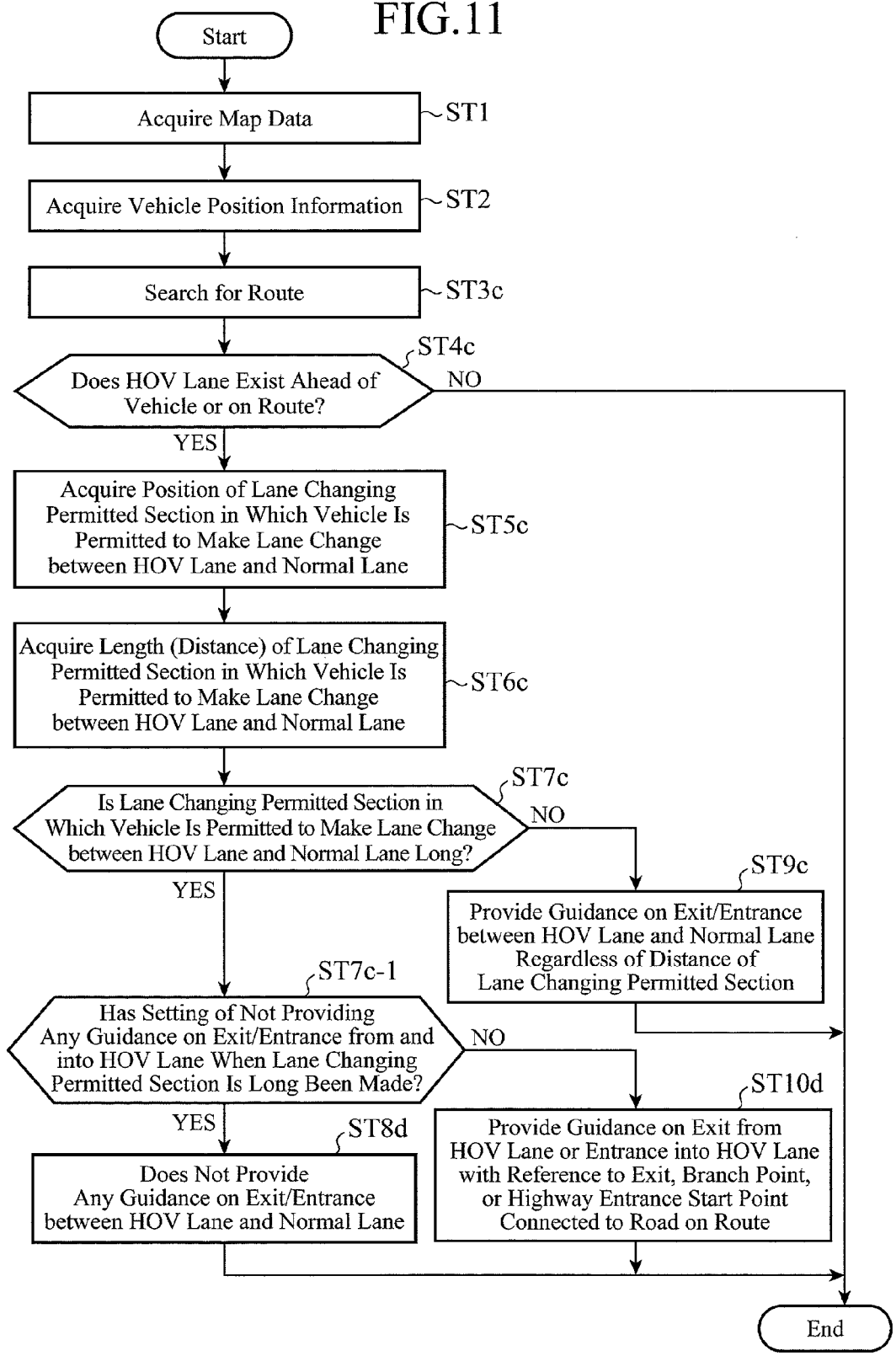
FIG. 11 is a flow chart showing an operation of a navigation device in accordance with Embodiment 6 of the present invention.

FIG. 11 is a flow chart showing an operation of the navigation device in accordance with Embodiment 6, focusing on a guiding process. Hereafter, steps in each of which the same process in a corresponding step shown in the flow chart of FIG. 10 is carried out are designated by the same reference characters as those shown in FIG. 10, and the explanation of the steps will be simplified.

When the guiding process is started, map data are acquired first (step ST1). Vehicle position information is then acquired (step ST2). A route search is then carried out (step ST3c). It is then checked to see whether an HOV lane exists ahead of a vehicle or on a route (step ST4c). When it is determined in this step ST4c that no HOV lane exists ahead of the vehicle or no HOV lane exists on the route, the navigation device ends the guiding process.

In contrast, when it is determined in step ST4c that an HOV lane exists ahead of the vehicle or on the route, the position of a lane changing permitted section in which the vehicle is permitted to make a lane change between the HOV lane and a normal lane is then acquired (step ST5c). The length (distance) of the lane changing permitted section in which the vehicle is permitted to make a lane change between the HOV lane and the normal lane is then acquired (step ST6c).

It is then checked to see whether or not the lane changing permitted section in which the vehicle is permitted to make a lane change between the HOV lane and the normal lane is long (step ST7c). When it is determined in this step ST7c that the lane changing permitted section in which the vehicle is permitted to make a lane change between the HOV lane and the normal lane is not long, guidance on exit/entrance between the HOV lane and the normal lane is provided regardless of the distance of the lane changing permitted section (step ST9c). After that, the navigation device ends the guiding process.

In contrast, when it is determined in step ST7c that the lane changing permitted section in which the vehicle is permitted to make a lane change between the HOV lane and the normal lane is long, it is then checked to see whether a setting of not providing any guidance on exit/entrance from and into the HOV lane when the lane changing permitted section is long has been made (step ST7c-1). More specifically, when the lane changing permitted section is long, a control part 30 checks to see whether the user has made a setting of not providing any guidance on exit/entrance from and into the HOV lane. The user is allowed to make this setting by using, for example, an input unit 11. The input unit 11 which the user uses when making a setting of not providing any guidance on exit/entrance from and into the HOV lane functions as a setting unit in accordance with the present invention.

When it is determined in this step ST7c-1 that a setting of not providing any guidance on exit/entrance from and into the HOV lane when the lane changing permitted section is long has been made, no guidance on exit/entrance between the HOV lane and the normal lane is provided (step ST8d). The navigation device can be constructed in such a way as not to, in this step ST8d, provide only any guidance on exit, only any guidance on entrance, or both any guidance on exit and any guidance on entrance. After that, the navigation device ends the guiding process.

In contrast, when it is determined in above-mentioned step ST7c-1 that no setting of not providing any guidance on exit/entrance from and into the HOV lane when the lane changing permitted section is long has been made, guidance on exit from the HOV lane or entrance into the HOV lane is provided with reference to an exit, a branch point, or a highway entrance start point connected to the road on the route (step ST10d). The process of this step ST10d is the same as that of step ST8c of the guiding process (refer to FIG. 7) carried out by the navigation device in accordance with above-mentioned Embodiment 4. After that, the navigation device ends the guiding process.

As explained above, because the navigation device in accordance with Embodiment 6 of the present invention is constructed in such a way as to change whether or not to provide guidance on exit and guidance on entrance according to a setting made by the user, the navigation device can suit itself to the user's request.

Embodiment 7

A navigation device in accordance with Embodiment 7 of the present invention is constructed in such a way as to provide guidance on an advance preparation when the user enters an HOV lane from a normal lane. The structure of the navigation device in accordance with this Embodiment 7 is the same as that of the navigation device in accordance with Embodiment 1 shown in FIGS. 1 and 2.

Figure 12:
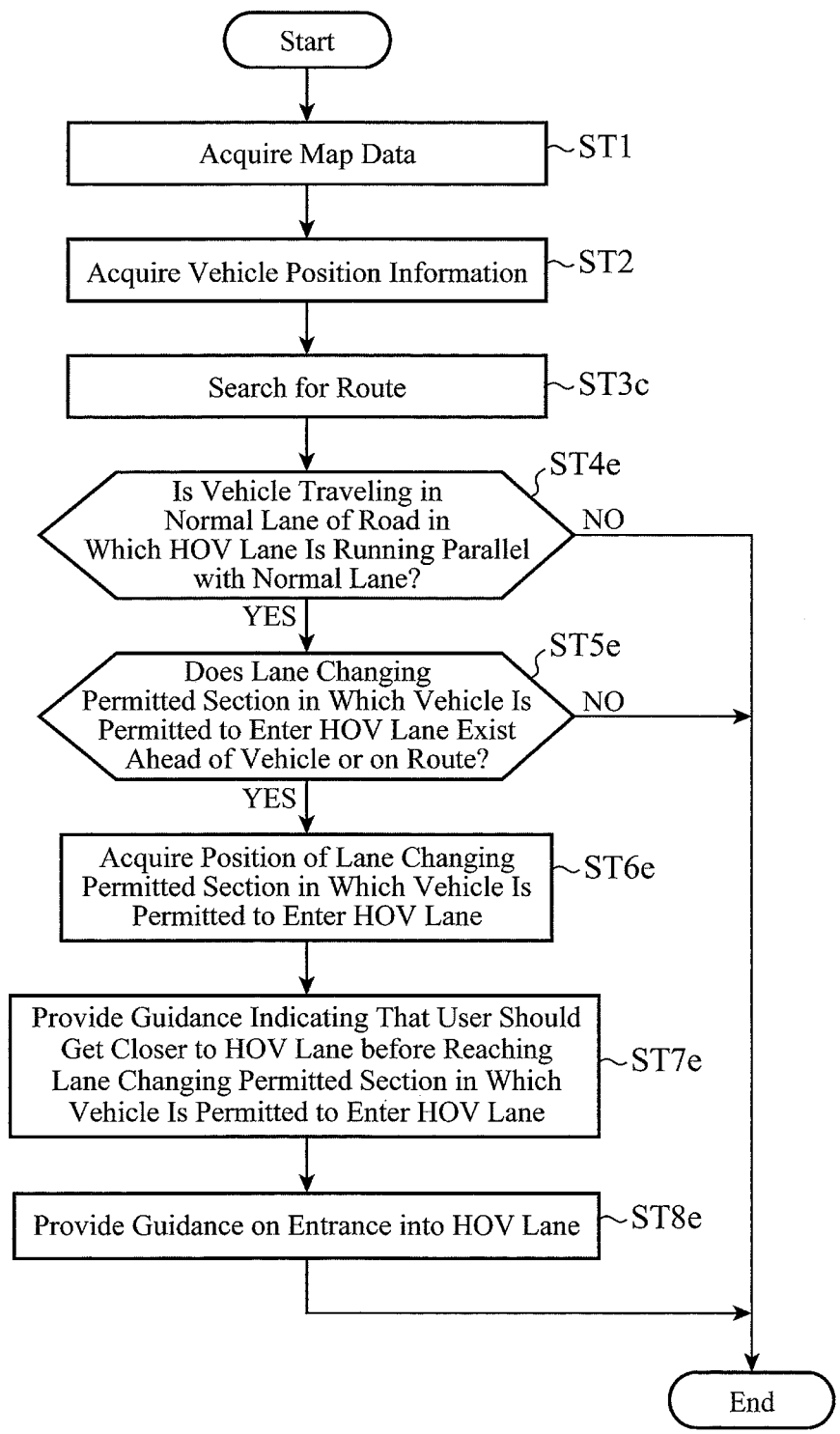
FIG. 12 is a flow chart showing an operation of a navigation device in accordance with Embodiment 7 of the present invention.

FIG. 12 is a flow chart showing an operation of the navigation device in accordance with Embodiment 7, focusing on a guiding process. Hereafter, steps in each of which the same process in a corresponding step shown in the flow chart of FIG. 7 is carried out are designated by the same reference characters as those shown in FIG. 7, and the explanation of the steps will be simplified.

When the guiding process is started, map data are acquired first (step ST1). Vehicle position information is then acquired (step ST2). A route search is then carried out (step ST3c). The process of this step ST3c is skipped at the time of providing no route guidance. It is then checked to see whether or not a vehicle is traveling in a normal lane of a road in which an HOV lane is running parallel with the normal lane (step ST4e). More specifically, an HOV lane determining unit 35 determines whether or not an HOV lane is included in the road included in the map data from a map data acquiring unit 31, and sends the result of the determination to a control part 30. The control part 30 checks to see whether the result of the determination received from the HOV lane determining unit 35 shows that an HOV lane is included in the road and whether or not the current position shown by the vehicle position information received in step ST2 is on the normal lane running parallel with the HOV lane.

When it is determined in this step ST4e that the vehicle is not traveling in a normal lane of the road in which an HOV lane is running parallel with the normal lane, the navigation device ends the guiding process. In contrast, when it is determined in step ST4e that the vehicle is traveling in a normal lane of the road in which an HOV lane is running parallel with the normal lane, it is then checked to see whether there exists a lane changing permitted section in which the vehicle is permitted to enter the HOV lane ahead of the vehicle or on the route (step ST5e). More specifically, when the result of the determination sent thereto from the HOV lane determining unit 35 shows that an HOV lane is included in the road or an HOV lane exists on the route, an HOV lane entrance and exit extracting unit 36 extracts an entrance and exit section in which the vehicle is permitted to make a lane change between a normal lane and the HOV lane. The entrance and exit section extracted by this HOV lane entrance and exit extracting unit 36 is notified to the control part 30 as entrance and exit position data. The control part 30 checks to see whether there exists a lane changing permitted section in which the vehicle is permitted to enter an HOV lane ahead of the vehicle or on the route on the basis of the entrance and exit position data from the HOV lane entrance and exit extracting unit 36. When it is determined in this step ST5e that no lane changing permitted section in which the vehicle is permitted to enter an HOV lane exits ahead of the vehicle, or no lane changing permitted section in which the vehicle is permitted to enter an HOV lane exits on the route, the navigation device ends the guiding process.

In contrast, when it is determined in this step ST5e that a lane changing permitted section in which the vehicle is permitted to enter an HOV lane exits ahead of the vehicle or on the route, the position of the lane changing permitted section in which the vehicle is permitted to enter the HOV lane is then acquired (step ST6e). More specifically, the HOV lane entrance and exit extracting unit 36 extracts the entrance and exit section in which the vehicle is permitted to make a lane change between a normal lane and the HOV lane which exists ahead of the vehicle, and notifies the entrance and exit section to the control part 30 as entrance and exit position data. The control part 30 acquires the section shown by the entrance and exit position data sent thereto from the HOV lane entrance and exit extracting unit 36 as a lane changing permitted section in which the vehicle is permitted to enter the HOV lane from the normal lane.

Guidance indicating that the user should get closer to the HOV lane within the normal lane before reaching the lane changing permitted section in which the vehicle is permitted to enter the HOV lane is provided (step ST7e). This guidance indicating that the user should get closer to the HOV lane within the normal lane corresponds to the guidance on an advance preparation in accordance with the present invention. Guidance on entrance into the HOV lane is then provided (step ST8e). After that, the navigation device ends the guiding process.

As previously explained, because the navigation device in accordance with Embodiment 7 of the present invention is constructed in such a way as to separately provide both guidance on an advance preparation for entrance into an HOV lane, and guidance on entrance into the HOV lane, the navigation device makes it possible for the user to be aware that the user should make a lane change in advance, thereby being able to prevent the user from being in danger of hastily making a lane change to the HOV lane.

Embodiment 8

A navigation device in accordance with Embodiment 8 of the present invention is constructed in such a way as to provide guidance on entrance into an HOV lane at a time according to the number of lanes when a vehicle is traveling in a normal lane. The structure of the navigation device in accordance with this Embodiment 8 is the same as that of the navigation device in accordance with Embodiment 1 shown in FIGS. 1 and 2.

Figure 13:
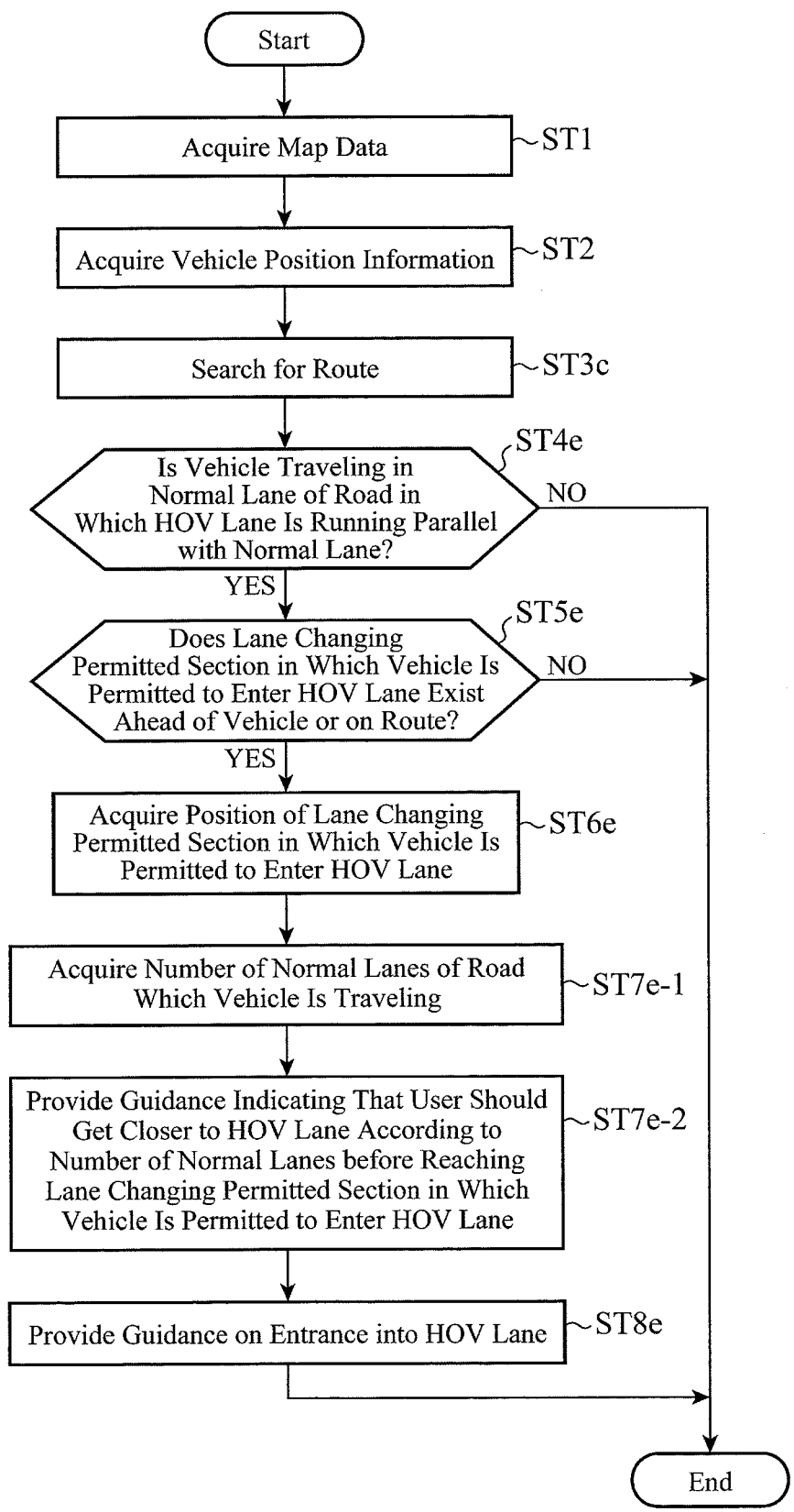
FIG. 13 is a flow chart showing an operation of a navigation device in accordance with Embodiment 8 of the present invention.

FIG. 13 is a flow chart showing an operation of the navigation device in accordance with Embodiment 8, focusing on a guiding process. Hereafter, steps in each of which the same process in a corresponding step shown in the flow chart of FIG. 12 is carried out are designated by the same reference characters as those shown in FIG. 12, and the explanation of the steps will be simplified.

When the guiding process is started, map data are acquired first (step ST1). Vehicle position information is then acquired (step ST2). A route search is then carried out (step ST3c). The process of this step ST3c is skipped at the time of providing no route guidance. It is then checked to see whether or not the vehicle is traveling in a normal lane of a road in which an HOV lane is running parallel with the normal lane (step ST4e). When it is determined in this step ST4e that the vehicle is not traveling in a normal lane of the road in which an HOV lane is running parallel with the normal lane, the navigation device ends the guiding process.

In contrast, when it is determined in step ST4e that the vehicle is traveling in a normal lane of the road in which an HOV lane is running parallel with the normal lane, it is then checked to see whether there exists a lane changing permitted section in which the vehicle is permitted to enter the HOV lane ahead of the vehicle or on the route (step ST5e). When it is determined in this step ST5e that no lane changing permitted section in which the vehicle is permitted to enter the HOV lane exits ahead of the vehicle, or no lane changing permitted section in which the vehicle is permitted to enter an HOV lane exits on the route, the navigation device ends the guiding process.

In contrast, when it is determined in step ST5e that a lane changing permitted section in which the vehicle is permitted to enter the HOV lane exits ahead of the vehicle or on the route, the position of the lane changing permitted section in which the vehicle is permitted to enter the HOV lane is then acquired (step ST6e).

The number of normal lanes of the road which the vehicle is traveling is then acquired (step ST7e-1). More specifically, a control part 30 acquires the number of normal lanes of the road from the map data acquired from a map data acquiring unit 31 in step ST1. Next, guidance indicating that the vehicle should get closer to the HOV lane is provided according to the number of normal lanes acquired in step ST7e-1 before the vehicle reaches the lane changing permitted section in which the vehicle is permitted to enter the HOV lane (step ST7e-2). For example, when the number of normal lanes is small, the guidance indicating that the vehicle should get closer to the HOV lane can be provided at a somewhat late time before the vehicle reaches the lane changing permitted section. The control part can be alternatively constructed in such a way as not to provide the guidance when the number of normal lanes is small, such as 2. In contrast with this, because a sudden provision of the guidance on entrance into the HOV lane makes it difficult for the user to smoothly make lane changes to the HOV lane when the number of normal lanes is large, the control part provides the guidance at an earlier time before the vehicle reaches the lane changing permitted section. Thus, the navigation device provides the guidance in one of the different ways depending on the number of normal lanes.

Then, because the user ought to have completed lane changes to the normal lane which is next to the HOV lane through the above-mentioned processes, guidance on entrance into the HOV lane is provided (step ST8e). After that, the navigation device ends the guiding process.

As previously explained, the navigation device in accordance with Embodiment 8 of the present invention changes the time that the navigation device provides guidance on an advance preparation for entrance into an HOV lane according to the number of normal lanes, thereby being able to prevent the guidance from being provided at an inappropriate time, such as at a too early time or at a too late time.

Generally, it doesn't matter if the guidance indicating that the vehicle should get closer to the HOV lane is provided at a somewhat late time when the number of normal lanes is small. Further, the navigation device can be constructed in such a way as not to provide the guidance when the number of normal lanes is small, such as 2. In contrast with this, because a sudden provision of the guidance on entrance into the HOV lane makes it difficult for the user to smoothly make lane changes to the HOV lane when the number of normal lanes is large, it is effective to provide the guidance at an earlier time.

Embodiment 9

A navigation device in accordance with Embodiment 9 of the present invention is constructed in such a way as to provide guidance on entrance into an HOV lane when a vehicle is traveling in a normal lane by assuming that the number of normal lanes is a maximum number of lanes, e.g. ten in the structure of the navigation device in accordance with Embodiment 7. The structure of the navigation device in accordance with this Embodiment 9 is the same as that of the navigation device in accordance with Embodiment 1 shown in FIGS. 1 and 2.

Figure 14:
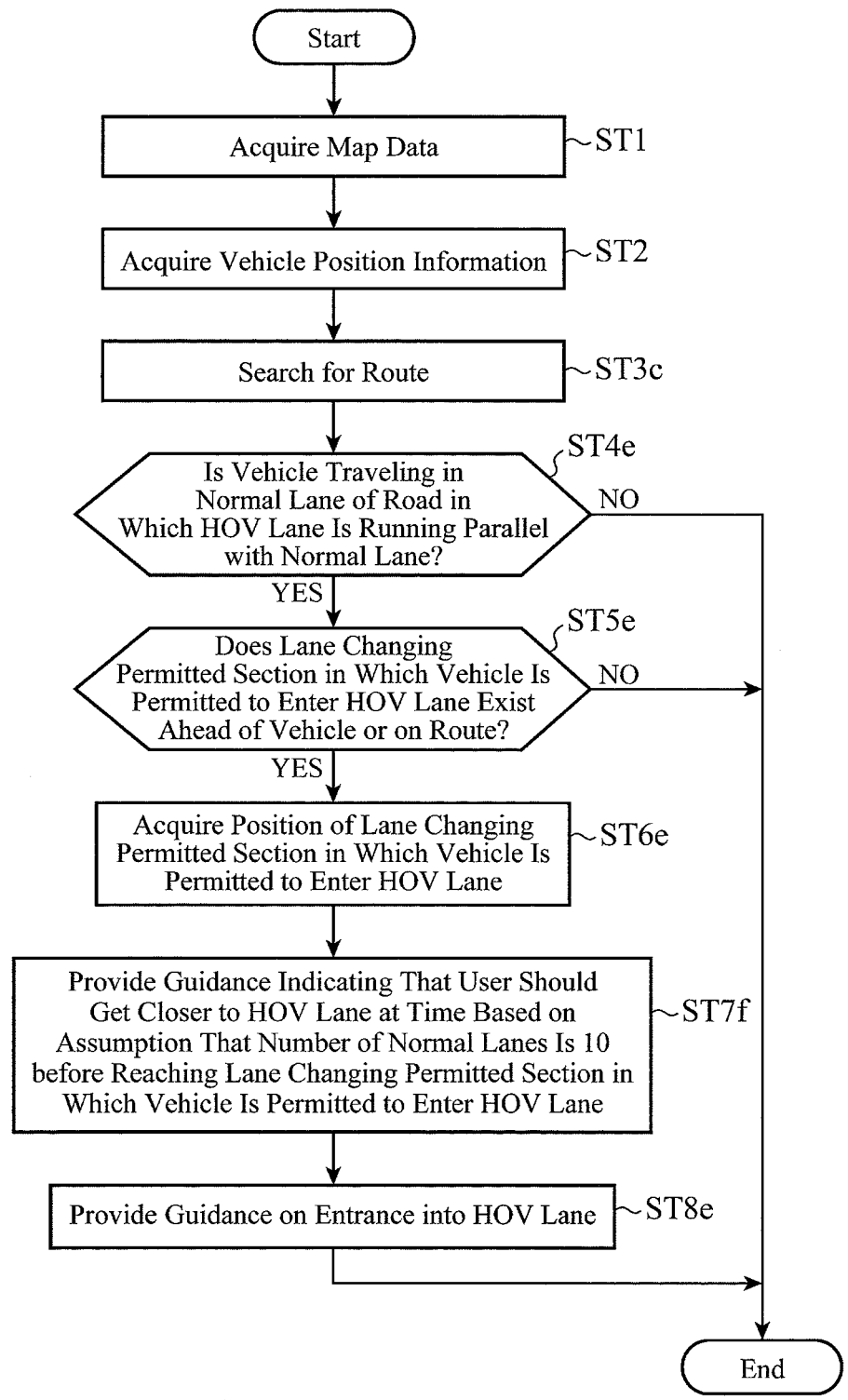
FIG. 14 is a flow chart showing an operation of a navigation device in accordance with Embodiment 9 of the present invention.

FIG. 14 is a flow chart showing an operation of the navigation device in accordance with Embodiment 9, focusing on a guiding process. Hereafter, steps in each of which the same process in a corresponding step shown in the flow chart of FIG. 12 is carried out are designated by the same reference characters as those shown in FIG. 12, and the explanation of the steps will be simplified.

When the guiding process is started, map data are acquired first (step ST1). Vehicle position information is then acquired (step ST2). A route search is then carried out (step ST3c). The process of this step ST3c is skipped at the time of providing no route guidance. It is then checked to see whether or not the vehicle is traveling in a normal lane of a road in which an HOV lane is running parallel with the normal lane (step ST4e). When it is determined in this step ST4e that the vehicle is not traveling a normal lane of the road in which an HOV lane is running parallel with the normal lane, the navigation device ends the guiding process.

In contrast, when it is determined in step ST4e that the vehicle is traveling a normal lane of the road in which an HOV lane is running parallel with the normal lane, it is then checked to see whether there exists a lane changing permitted section in which the vehicle is permitted to enter the HOV lane ahead of the vehicle or on the route (step ST5e). When it is determined in this step ST5e that no lane changing permitted section in which the vehicle is permitted to enter the HOV lane exits ahead of the vehicle, or no lane changing permitted section in which the vehicle is permitted to enter an HOV lane exits on the route, the navigation device ends the guiding process.

In contrast, when it is determined in this step ST5e that a lane changing permitted section in which the vehicle is permitted to enter the HOV lane exits ahead of the vehicle or on the route, the position of the lane changing permitted section in which the vehicle is permitted to enter the HOV lane is then acquired (step ST6e).

Next, guidance indicating that the vehicle should get closer to the HOV lane is provided at a time which is determined by assuming that the number of normal lanes is 10 before the vehicle reaches the lane changing permitted section in which the vehicle is permitted to enter the HOV lane (step ST7f).

More specifically, a control part 30 assumes the maximum number of lanes to be a fixed number (e.g. ten), and provides guidance indicating that the vehicle should get closer to the HOV lane at a time which the control part determines in consideration of the time required for the vehicle to move throughout the assumed number of lanes, and before the vehicle reaches the lane changing permitted section in which the vehicle is permitted to enter the HOV lane. By thus providing the guidance in consideration of the maximum number of lanes, the navigation device can prevent the user from making forcible lane changes.

Then, because the user ought to have completed lane changes to the normal lane which is next to the HOV lane through the above-mentioned processes, guidance on entrance into the HOV lane is provided (step ST8$e$). After that, the navigation device ends the guiding process.

As previously explained, because the navigation device in accordance with Embodiment 9 of the present invention is constructed in such a way as to separately provide both guidance on an advance preparation for entrance into an HOV lane, and guidance on entrance into the HOV lane, the navigation device makes it possible for the user to be aware that the user should make lane changes in advance, thereby being able to prevent the user from being in danger of hastily making lane changes to the HOV lane. Further, by determining the time that the navigation device provides guidance according to the maximum number of lanes, the navigation device can prevent the user from being in danger of making forcible lane changes, and can notify guidance information to the user at the same timing.

Embodiment 10

A navigation device in accordance with Embodiment 10 of the present invention is constructed in such a way as to provide guidance on an advance preparation when the user exits an HOV lane to a normal lane. The structure of the navigation device in accordance with this Embodiment 10 is the same as that of the navigation device in accordance with Embodiment 1 shown in FIGS. 1 and 2.

Figure 15:
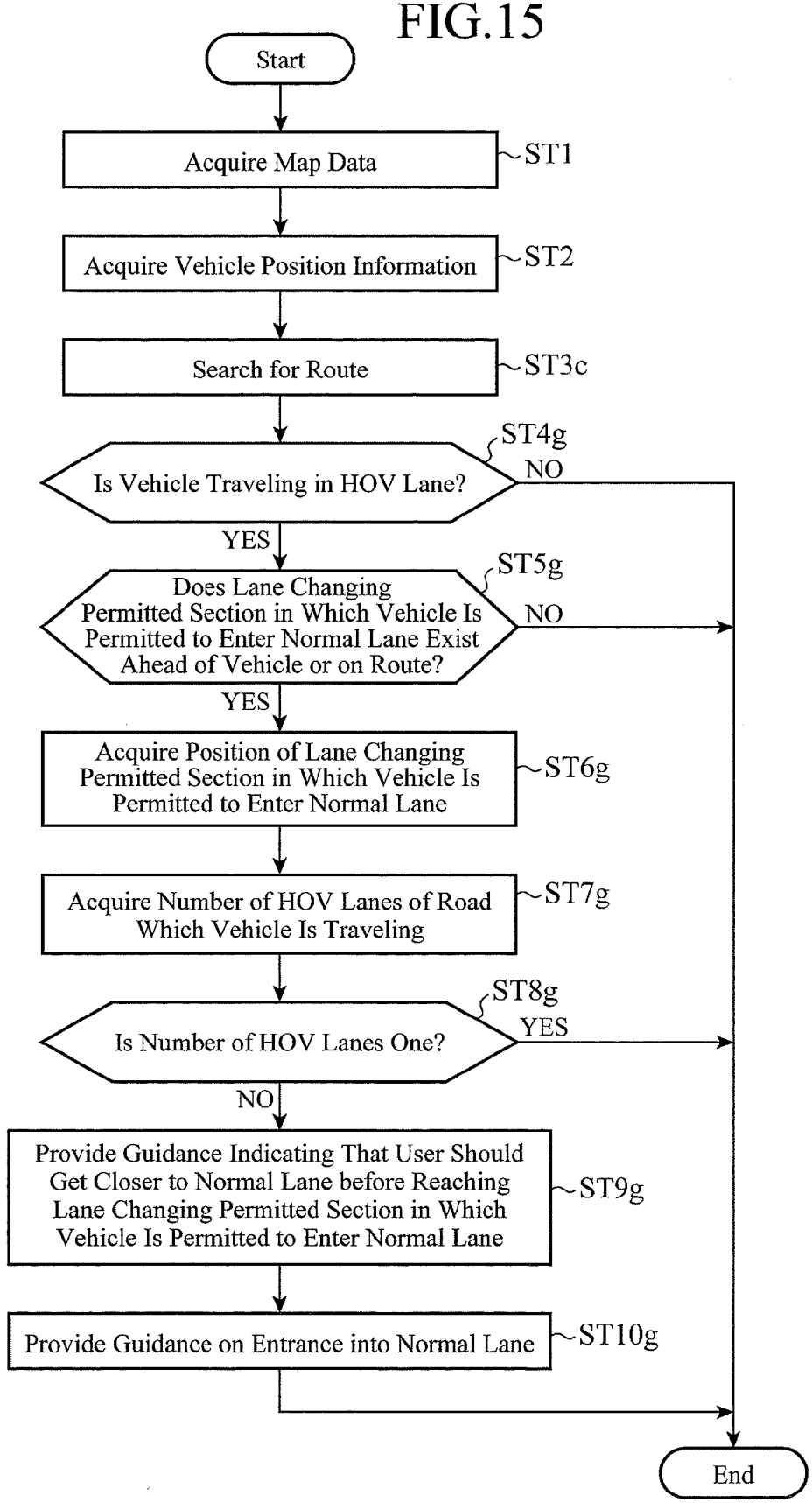
FIG. 15 is a flow chart showing an operation of a navigation device in accordance with Embodiment 10 of the present invention.

FIG. 15 is a flow chart showing an operation of the navigation device in accordance with Embodiment 10, focusing on a guiding process. Hereafter, steps in each of which the same process in a corresponding step shown in the flow chart of FIG. 13 is carried out are designated by the same reference characters as those shown in FIG. 13, and the explanation of the steps will be simplified.

When the guiding process is started, map data are acquired first (step ST1). Vehicle position information is then acquired (step ST2). A route search is then carried out (step ST3$c$). The process of this step ST3$c$ is skipped at the time of providing no route guidance. It is then checked to see whether or not a vehicle is traveling in an HOV lane (step ST4$g$). More specifically, an HOV lane determining unit 35 determines whether or not an HOV lane is included in the road included in the map data from a map data acquiring unit 31, and sends the result of the determination to a control part 30. The control part 30 checks to see whether the result of the determination received from the HOV lane determining unit 35 shows that an HOV lane is included in the road, and whether or not the current position shown by the vehicle position information received in step ST2 is on the HOV lane. When it is determined in this step ST4$g$ that the vehicle is not traveling in an HOV lane, the navigation device ends the guiding process.

In contrast, when it is determined in step ST4$g$ that the vehicle is traveling in an HOV lane, it is then checked to see whether there exists a lane changing permitted section in which the vehicle is permitted to enter the normal lane ahead of the vehicle or on a route (step ST5$g$). More specifically, when the result of the determination sent thereto from the HOV lane determining unit 35 shows that an HOV lane is included in the road or exists on the route, an HOV lane entrance and exit extracting unit 36 extracts an entrance and exit section in which the vehicle is permitted to make a lane change between the normal lane and the HOV lane. The entrance and exit section extracted by this HOV lane entrance and exit extracting unit 36 is notified to the control part 30 as entrance and exit position data. The control part 30 checks to see whether there exists a lane changing permitted section in which the vehicle is permitted to enter the normal lane ahead of the vehicle or on the route on the basis of the entrance and exit position data sent thereto from the HOV lane entrance and exit extracting unit 36. When it is determined in this step ST5$g$ that no lane changing permitted section in which the vehicle is permitted to enter the normal lane exists ahead of the vehicle, or no lane changing permitted section in which the vehicle is permitted to enter the normal lane exists on the route, the navigation device ends the guiding process. The determination of whether there exists a lane changing permitted section in which the vehicle is permitted to enter the normal lane on the route is effective only when the route search is carried out in step ST3$c$.

In contrast, when it is determined in step ST5$g$ that there exists a lane changing permitted section in which the vehicle is permitted to enter the normal lane ahead of the vehicle or on the route, the position of the lane changing permitted section in which the vehicle is permitted to enter the normal lane is then acquired (step ST6$g$). The number of HOV lanes of the road which the vehicle is traveling is then acquired (step ST7$g$). It is then checked to see whether or not the number of HOV lanes is one (step ST8$g$). When it is determined in this step ST8$g$ that the number of HOV lanes is one, the navigation device ends the guiding process.

In contrast, when it is determined in step ST8$g$ that the number of HOV lanes is not one, guidance indicating that the user should get closer to the normal lane before reaching the lane changing permitted section in which the vehicle is permitted to enter the normal lane is provided according to the number of lanes acquired in step ST7$g$ (step ST9$g$). Because there is a case in which the vehicle is not permitted to make a lane change between HOV lanes in a lane changing permitted section in which the vehicle is permitted to make a lane change between an HOV lane and a normal lane, depending on a road in which a HOV lane and a normal lane is expressed by a single link (within the lane changing permitted section, there is a section in which the vehicle is permitted to make a lane change to a normal lane as long as the vehicle is traveling in a lane (an HOV lane) adjacent (parallel) to the normal lanes), the vehicle needs to move to the HOV lane adjacent (parallel) to the normal lanes in advance.

Then, because the vehicle ought to have moved to the HOV lane which is the nearest to the normal lanes (the HOV lane to the side of the normal lanes) through the above-mentioned processes, guidance on entrance into the HOV lane is provided (step ST10$g$). After that, the navigation device ends the guiding process.

As previously explained, because the navigation device in accordance with Embodiment 10 of the present invention is constructed in such a way as to separately provide both guidance on an advance preparation for exit from an HOV lane, and guidance on entrance into a normal lane, the navigation device makes it possible for the user to be aware that the user should make a lane change in advance, thereby being able to prevent the user from being in danger of hastily making lane changes to exit an HOV lane.

Embodiment 11

A navigation device in accordance with Embodiment 11 of the present invention is constructed in such a way as to change a time when the navigation device provides guidance and the number of times that the navigation device provides the guidance according to whether or not a vehicle is traveling in an HOV lane. The structure of the navigation device in accordance with this Embodiment 11 is the same as that of the navigation device in accordance with Embodiment 1 shown in FIGS. 1 and 2.

Figure 16:
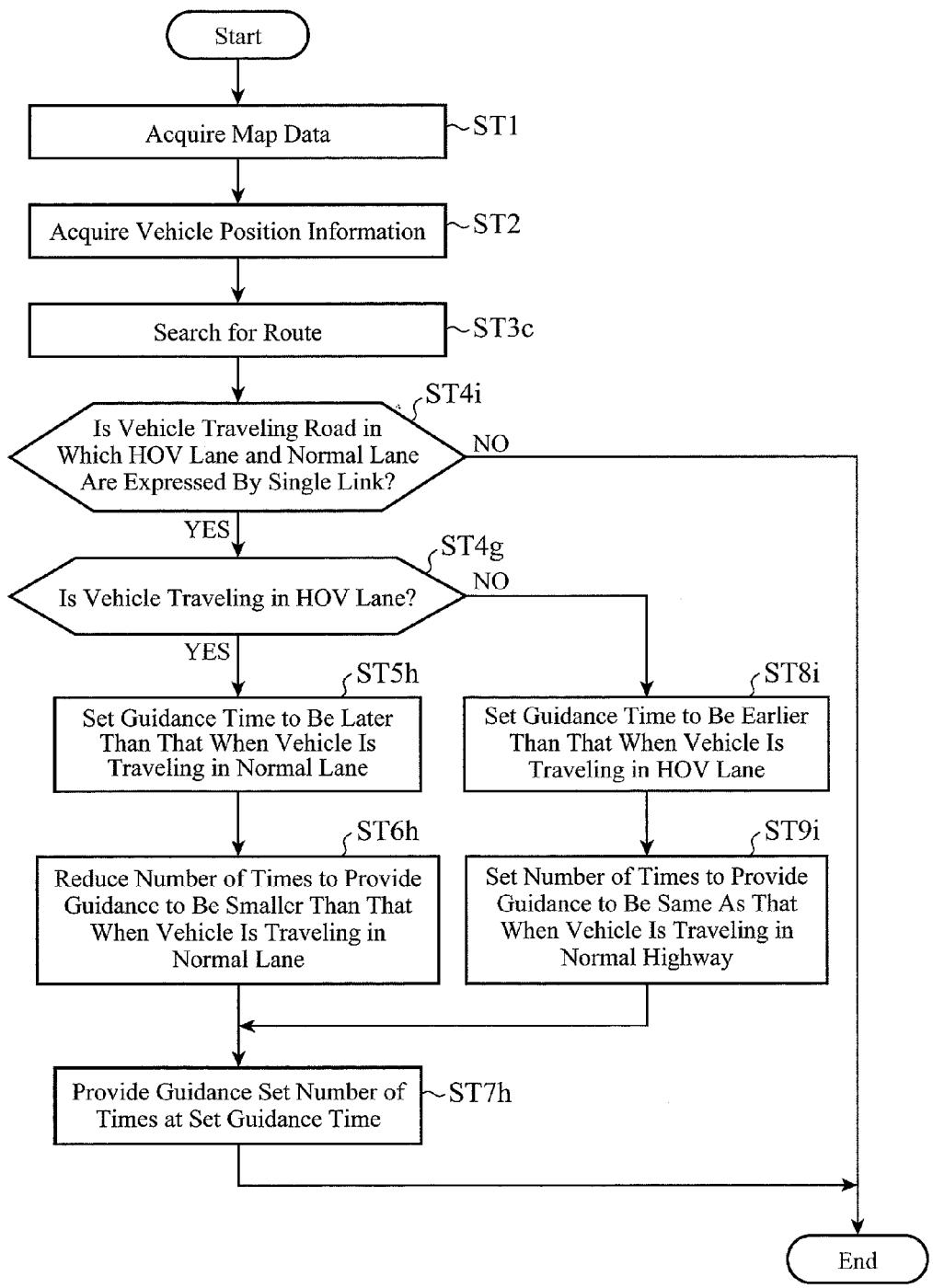
FIG. 16 is a flow chart showing an operation of a navigation device in accordance with Embodiment 11 of the present invention.

FIG. 16 is a flow chart showing an operation of the navigation device in accordance with Embodiment 11, focusing on a guiding process. Hereafter, steps in each of which the same process in a corresponding step shown in the flow chart of FIG. 15 is carried out are designated by the same reference characters as those shown in FIG. 15, and the explanation of the steps will be simplified.

When the guiding process is started, map data are acquired first (step ST1). Vehicle position information is then acquired (step ST2). A route search is then carried out (step ST3c). The process of this step ST3c is skipped at the time of providing no route guidance. It is then checked to see whether or not the vehicle is traveling a road in which an HOV lane and a normal lane are expressed by a single link (step ST4i). When it is determined in this step ST4i that the vehicle is not traveling a road in which an HOV lane and a normal lane are expressed by a single link, the navigation device ends the guiding process.

In contrast, when it is determined in step ST4i that the vehicle is not traveling a road in which an HOV lane and a normal lane are expressed by a single link, it is then checked to see whether or not the vehicle is traveling in an HOV lane (step ST4g). When it is determined in this step ST4g that the vehicle is traveling in an HOV lane, the time that the navigation device provides guidance is then set to be later than that when the vehicle is traveling in a normal lane (step ST5h).

The number of times that the navigation device provides the guidance is then reduced to be smaller than that when the vehicle is traveling in a normal lane (step ST6h). The navigation device then provides the guidance the number of times set thereby at the guidance time set thereby (step ST7h). After that, the navigation device ends the guiding process. The navigation device can be constructed in such a way as to carry out either one of the processes of steps ST5h and ST6h.

When it is determined in above-mentioned step ST4g that the vehicle is not traveling in an HOV lane, the time that the navigation device provides the guidance is then set to be earlier than that when the vehicle is traveling in an HOV lane (step ST8i). More specifically, the time that the navigation device provides the guidance is set to be the same as the time that the navigation device provides other guidance. The number of times that the navigation device provides the guidance is set to be the same as the number of times that the navigation device provides guidance when the vehicle is traveling in a normal highway (step ST9i). After that, the navigation device advances the sequence to step ST7h, and provides the guidance the number of times set thereby in step ST9i at the guidance time set thereby in step ST8i.

As previously explained, the navigation device in accordance with Embodiment 11 of the present invention is effective for a case in which the number of HOV lanes is small fundamentally, and it is not necessary to provide the user with a preparation (also including a mental preparation) for the next movement at an earlier time before reaching a guidance point. Further, because it can be assumed that the user can easily drive the vehicle even if the navigation device does not provide any guidance (caution) repeatedly, the navigation device can reduce discomfort provided for the user more effectively and can provide appropriate guidance by setting different times when providing guidance and different numbers of times that guidance is provided for HOV lanes and normal lanes. The present invention is effective not only for guidance on entrance/exit between an HOV lane and a normal lane, but also for guidance on a branch on an HOV lane.

Variant 1 of Embodiment 11

A navigation device in accordance with Variant 1 of Embodiment 11 of the present invention is constructed in such a way as to provide guidance at a time according to the number of lanes of a road which a vehicle is traveling. The structure of the navigation device in accordance with this Variant 1 of Embodiment 11 is the same as that of the navigation device in accordance with Embodiment 1 shown in FIGS. 1 and 2.

Figure 17:
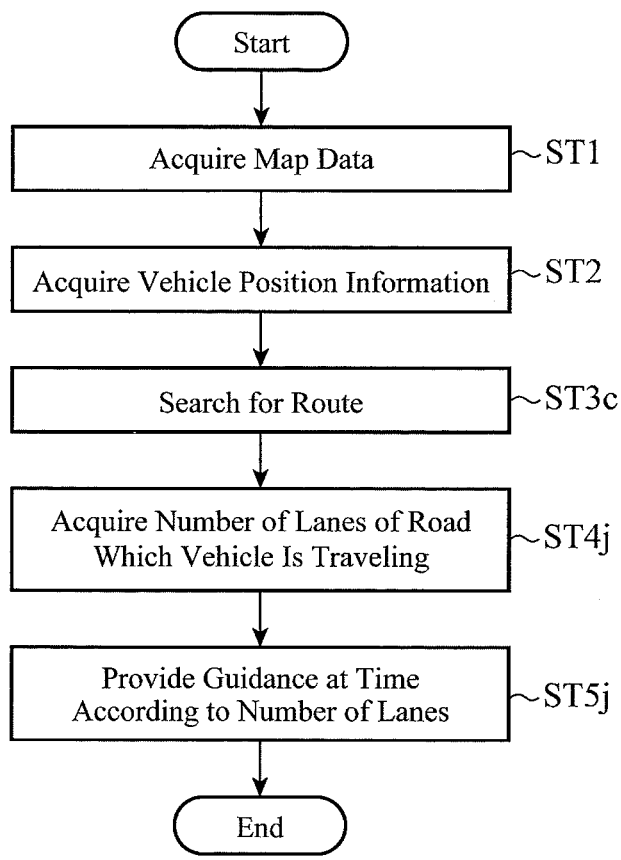
FIG. 17 is a flow chart showing an operation of a navigation device in accordance with a variant of Embodiment 11 of the present invention.

FIG. 17 is a flow chart showing an operation of the navigation device in accordance with Variant 1 of Embodiment 11, focusing on a guiding process. Hereafter, steps in each of which the same process in a corresponding step shown in the flow chart of FIG. 16 is carried out are designated by the same reference characters as those shown in FIG. 16, and the explanation of the steps will be simplified.

When the guiding process is started, map data are acquired first (step ST1). Vehicle position information is then acquired (step ST2). A route search is then carried out (step ST3c). The process of this step ST3c is skipped at the time of providing no route guidance.

The number of lanes of the road which the vehicle is traveling is then acquired (step ST4j). In this case, when an HOV lane and a normal lane in the road are expressed by a single link and the vehicle is traveling in the HOV lane of the road, the number of lanes including only HOV lanes is acquired, whereas when the vehicle is traveling in the normal lane of the road, the number of lanes including only normal lanes is acquired. Guidance is then provided at the time according to the number of lanes (step ST5j). After that, the navigation device ends the guiding process.

As previously explained, because there is a case in which the user needs to make a preparation, such as moving in a direction in which the user should move (in a direction toward an HOV lane or a normal lane), at the next guidance point when the vehicle is traveling a road with a large number of lanes, the navigation device in accordance with Variant 1 of Embodiment 11 of the present invention provides guidance at an earlier time when the vehicle is traveling a road with a larger number of lanes, whereas the navigation device provides guidance at a later time when the vehicle is traveling a road with a smaller number of lanes. Therefore, the navigation device makes it possible for the user to have a feeling of tension only within a time period during which the vehicle travels a moderate distance until reaching the guidance point.

Embodiment 12

A navigation device in accordance with Embodiment 12 of the present invention is constructed in such a way as to provide guidance at a time according to the position of a sign or the information written on a sign. The structure of the navigation device in accordance with this Embodiment 12 is the same as that of the navigation device in accordance with Embodiment 1 shown in FIGS. 1 and 2.

Figure 18:
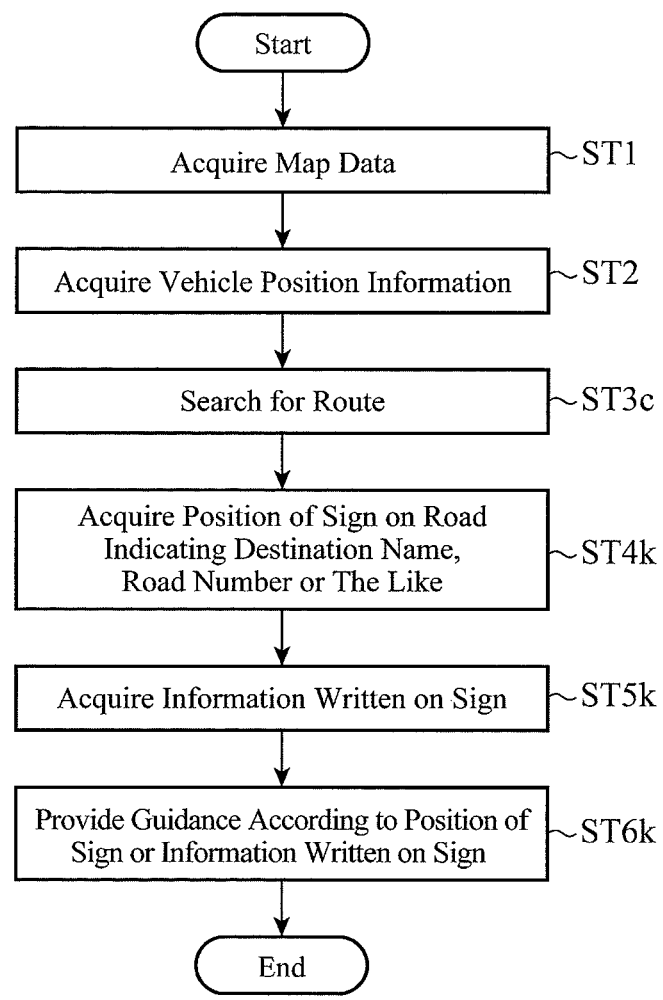
FIG. 18 is a flow chart showing an operation of a navigation device in accordance with Embodiment 12 of the present invention.

FIG. 18 is a flow chart showing an operation of the navigation device in accordance with Embodiment 12, focusing on a guiding process. Hereafter, steps in each of which the same process in a corresponding step shown in the flow chart of FIG. 16 is carried out are designated by the same reference characters as those shown in FIG. 16, and the explanation of the steps will be simplified.

When the guiding process is started, map data are acquired first (step ST1). Vehicle position information is then acquired (step ST2). A route search is then carried out (step ST3*c*). The process of this step ST3*c* is skipped at the time of providing no route guidance.

The position of a sign on the road indicating the name of a destination, a road number or the like is then acquired (step ST4*k*). The position of the sign can be acquired by using, for example, a method of acquiring the sign position from information stored in a map data storage unit 16, a method of detecting the actual position of the sign by using a forwardly-existing sign detecting camera 15, or a method of storing a rule governing where the sign is placed (e.g. how many meters from a branch the sign is located) and calculating the sign position by using software.

The information written on the sign is then acquired (step ST5*k*). More specifically, a control part 30 acquires the information written on the sign, such as the name of a place, an exit, a road name or a distance, on the basis of the sign data sent thereto from the forwardly-existing sign detecting unit 38. However, when providing guidance independent of the information written on the sign by using only the position of the sign, the navigation device skips this process of step ST5*k*.

Guidance is then provided according to either the position of the sign or the information written on the sign (step ST6*k*). More specifically, guidance is provided by taking into consideration both a time according to the position of the sign acquired in step ST4*k* and a time according to the information written on the sign acquired in step ST5*k* (i.e. a time according to a distance or the like written on the sign). As this guidance, at least one of voice guidance, a guide map display, or a telop display is provided, like in the case of providing normal guidance. After that, the navigation device ends the guiding process.

As previously explained, because the navigation device in accordance with Embodiment 12 of the present invention is constructed in such a way as to change a guidance time according to the position of a sign, the navigation device can provide guidance according to the position of a sign. As a result, because the navigation device can provide guidance matching road information, the navigation device enables the user to travel with safety without feeling uncomfortable during travel.

Further, because the navigation device is constructed in such a way as to provide guidance according to a distance written on a sign showing an exit, the navigation device can provide guidance on the distance matching the sign information, the navigation device enables the user to travel with safety without feeling uncomfortable during travel.

Further, because the navigation device is constructed in such a way as to provide guidance by using the position of a sign included in data, the navigation device can make a preparation for guidance in advance to adjust the time that the navigation device provides the guidance.

Further, because the navigation device is constructed in such a way as to detect the position of a sign by using the camera and provide guidance, the navigation device can provide guidance by using the actual position of a sign, thereby being able to solve the problem that the stored data are updated as time goes by, but cannot be used.

In addition, because the navigation device is constructed in such a way as to store a rule governing where a sign is placed (e.g. how many meters from a branch the sign is located) and provides guidance on the branch with reference to the position of the sign, the navigation device can get to know a positional relationship between the current position and the distance to the branch which is a target for guidance in advance to specify the sign associated with the branch which is a target for guidance, and can provide the user with appropriate sign information associated with the branch.

Embodiment 13

A navigation device in accordance with Embodiment 13 of the present invention is constructed in such a way as to provide guidance on a highway exit or a road toward which a vehicle can move when making a lane change from an HOV lane to a normal lane.

The structure of the navigation device in accordance with this Embodiment 13 is the same as that of the navigation device in accordance with Embodiment 1 shown in FIGS. 1 and 2.

Figure 19:
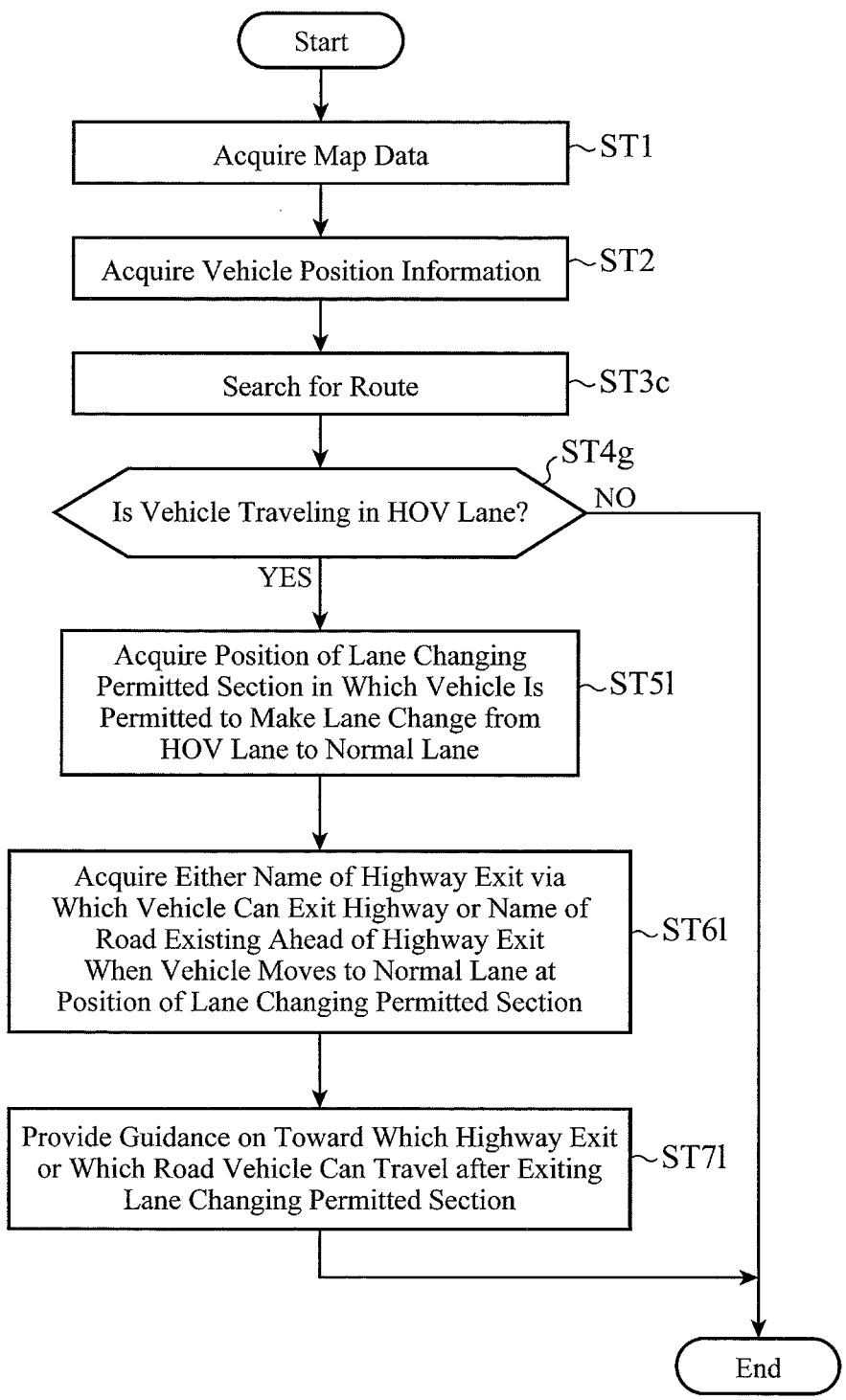
FIG. 19 is a flow chart showing an operation of a navigation device in accordance with Embodiment 13 of the present invention.

FIG. 19 is a flow chart showing an operation of the navigation device in accordance with Embodiment 13, focusing on a guiding process. Hereafter, steps in each of which the same process in a corresponding step shown in the flow chart of FIG. 16 is carried out are designated by the same reference characters as those shown in FIG. 16, and the explanation of the steps will be simplified.

When the guiding process is started, map data are acquired first (step ST1). Vehicle position information is then acquired (step ST2). A route search is then carried out (step ST3*c*). The process of this step ST3*c* is skipped at the time of providing no route guidance. It is then checked to see whether or not the vehicle is traveling in an HOV lane (step ST4*g*). When it is determined in this step ST4*g* that the vehicle is not traveling in an HOV lane, the navigation device ends the guiding process.

In contrast, when it is determined in step ST4*g* that the vehicle is traveling in an HOV lane, the position of a lane changing permitted section in which the vehicle is permitted to make a lane change from the HOV lane to a normal lane is then acquired (step ST51).

Then, when the vehicle moves to a normal lane at the position of the lane changing permitted section, either the name of a highway exit via which the vehicle can exit the highway (normal lane) or the road name of a road existing ahead of the highway exit is acquired (step ST61). As a method of acquiring the highway exit name or the road name used in this step ST61, a method of acquiring the highway exit name or the road name from information stored in a map data storage unit 16 (processing and storing information from attributes or the like), a method of detecting the information written on an actual sign by using a forwardly-existing sign detecting camera 15, or a software-based method of forwardly tracing links by using software to acquire the highway exit name or the road name can be used. The details of this software-based method will be mentioned later.

Then, guidance on toward which highway exit or road the vehicle can travel after exiting the lane changing permitted section is provided (step ST71). More specifically, guidance on the name of a highway exit or the road name of a road existing ahead of the highway exit which is acquired in step ST61 is provided. As this guidance, at least one of voice guidance, a telop, a telop and a beep (Pi sound), a guide map display, and so on is provided. After that, the navigation device ends the guiding process.

Next, an example of the software-based method will be explained in detail. FIG. 20 shows a case in which a lane changing permitted section in which the vehicle is permitted to make a lane change between an HOV lane and a normal lane exists ahead of the vehicle, and a highway exit extending from a normal lane exists ahead of the lane changing permitted section, and FIG. 20(*a*) shows a road image of the case and FIG. 20(*b*) shows a link image of the case which is expressed on map data.

FIG. 21 shows a status in which destination sign information is stored as interlink information. This example shows that the following characters: "I-405 S Long Beach" are displayed on an actual destination sign associated with a direction of travel from a link 3 to a link 4, and the following characters: "EXIT 13 Main Street Los Angeles" are displayed on an actual destination sign associated with a direction of travel from the link 3 to a link 5.

When finding out a link 2, in which the vehicle can make a change lane, in a forward direction when the vehicle is traveling in an HOV lane, the control part 30 traces the links in a forward direction of the vehicle to search for a highway exit link (or a highway branch link). In this example, the control part 30 can find out the highway exit link 5 and acquire the information on the highway exit from the interlink information on the link 3 and the link 5 to provide the following characters: "EXIT 13 Main Street Los Angeles." When the vehicle gets close to the section corresponding to the link 2, the control part 30 displays the following characters: "EXIT 13 Main Street Los Angeles" acquired previously on the screen of a display unit 17, and, when the vehicle moves from the HOV lane to a normal lane in the lane changing permitted section, the control part 30 provides guidance indicating that the user can use "Exit 13" to travel "Main Street" and then travel in the direction of "Los Angeles."

As a result, the user is enabled to determine whether the user should exit the HOV lane in either this lane changing permitted section or the next lane changing permitted section.

By further incorporating the following conditions (1) to (3) into the above search, the navigation device can provide more user-friendly guidance.

(1) Set the distance of a section within which the control part searches for the link 5 to be constant (2) Search for a plurality of exits (3) The link 5 is located at a fixed distance from the link 2

Although exit information is used as a restriction between links in the above-mentioned example, exit information can be alternatively stored in a node or a link.

As previously explained, the navigation device in accordance with Embodiment 13 of the present invention can provide guidance on in which lane changing permitted section the user should exit an HOV lane in order to make it possible for the vehicle to reach the user's destination when the vehicle is traveling in the HOV lane, and enables the user to use the HOV lane throughout all of a section appropriate for the user. Further, the navigation device can prevent the user from overshooting the user's desired exit (traveling in the HOV lane over a distance longer than necessary) and then taking a circuitous route to the destination, and can also prevent the user from making a needless lane change from the HOV lane to a normal lane at an early time and then running into a traffic jam.

Further, a criterion by which to determine whether or not to output at least one of a voice of a street name, a telop, a Pi sound, or a guide map as guidance on an exit at a time when the user exits an HOV lane can be processed and incorporated into data, and guidance can be provided by using the data. By registering linking of information showing which one of lane changing permitted sections in each of which the vehicle is permitted to make a lane change between an HOV lane and a normal lane is appropriate for entering each exit to this exit into the map data, an adjustment of a guidance time can be achieved in advance.

Further, by detecting a sign by using a camera and using the sign detected as the above-mentioned determination criterion, guidance can be provided. By detecting linking of information showing which one of lane changing permitted sections in each of which the vehicle is permitted to make a lane change between an HOV lane and a normal lane is appropriate for entering each exit to this exit from an actual road (using a camera) in software, guidance can be provided at an actual time, so that reliable guidance can be provided for the user.

Further, by forwardly tracing links to detect an exit as the above-mentioned determination criterion, guidance can be provided. By forwardly tracing links by using software to provide linking of information showing which one of lane changing permitted sections in each of which the vehicle is permitted to make a lane change between an HOV lane and a normal lane is appropriate for entering each exit to this exit, the navigation device can determine to which exit the vehicle can enter to provide guidance.

Embodiment 14

A navigation device in accordance with Embodiment 14 of the present invention is constructed in such a way as to enable the user to set either whether the user has exited an HOV lane or entered an HOV lane to the navigation device in the structure of the navigation device in accordance with Embodiment 1. The structure of the navigation device in accordance with this Embodiment 14 is the same as that of the navigation device in accordance with Embodiment 1 shown in FIGS. 1 and 2.

Figure 22:
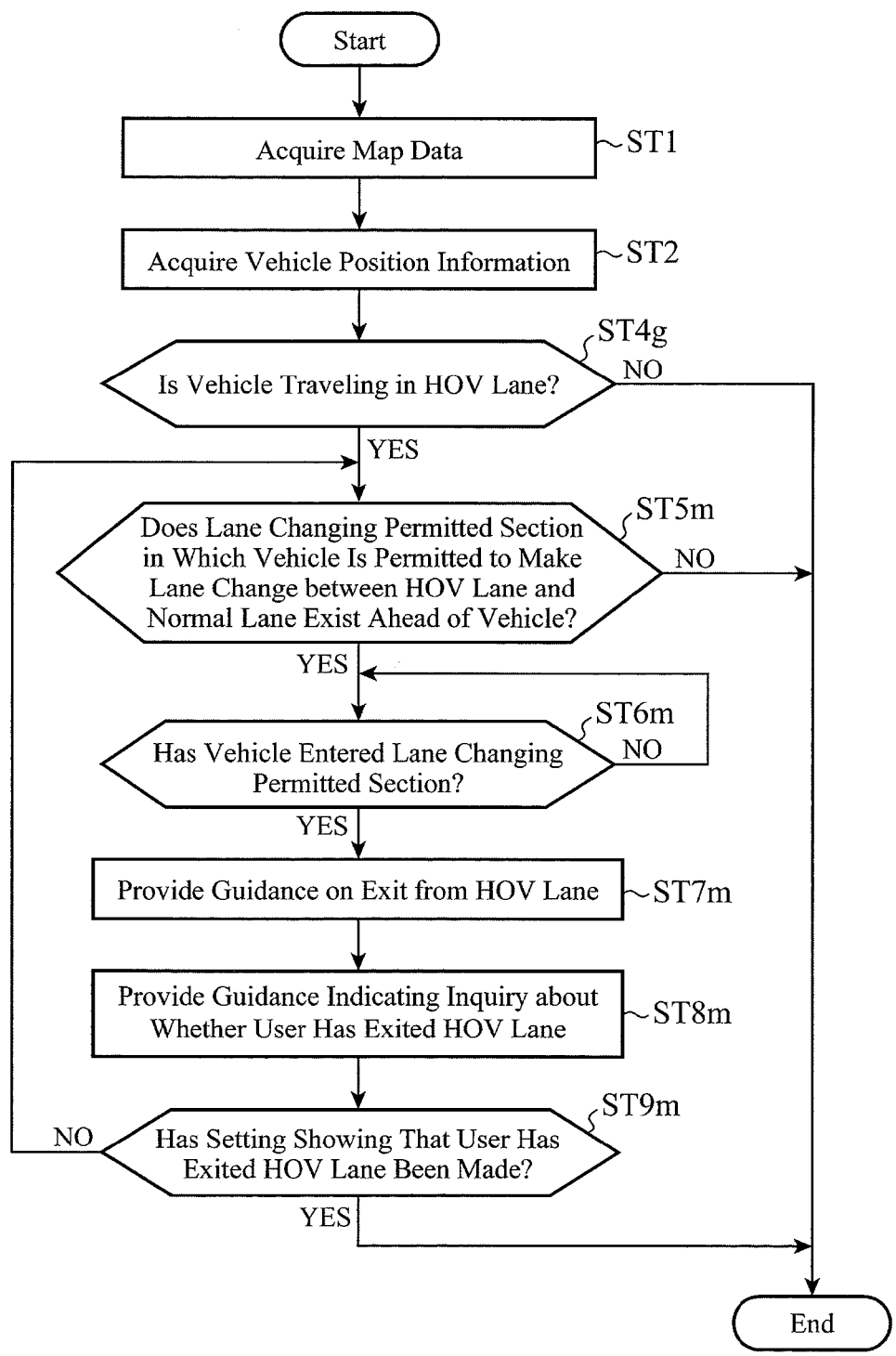
FIG. 22 is a flow chart showing an operation when the user exits an HOV lane which is performed by a navigation device in accordance with Embodiment 14 of the present invention.

FIG. 22 is a flow chart showing an operation when the user exits an HOV lane of the navigation device in accordance with Embodiment 14, focusing on a guiding process. Hereafter, steps in each of which the same process in a corresponding step shown in the flow chart of FIG. 15 is carried out are designated by the same reference characters as those shown in FIG. 15, and the explanation of the steps will be simplified.

When the guiding process is started, map data are acquired first (step ST1). Vehicle position information is then acquired (step ST2). It is then checked to see whether or not a vehicle is traveling in an HOV lane (step ST4*g*). When it is determined in this step ST4*g* that the vehicle is not traveling in an HOV lane, the navigation device ends the guiding process. In contrast, when it is determined in step ST4*g* that the vehicle is traveling in an HOV lane, it is then checked to see whether there exists a lane changing permitted section in which the vehicle is permitted to make a lane change between the HOV lane and a normal lane ahead of the vehicle (step ST5*m*). When it is determined in this step ST5*m* that there exists no lane changing permitted section in which the vehicle is permitted to make a lane change between the HOV lane and a normal lane ahead of the vehicle, the navigation device ends the guiding process.

In contrast, when it is determined in step ST5*m* that there exists no lane changing permitted section in which the vehicle is permitted to make a lane change between the HOV lane and a normal lane ahead of the vehicle, it is then checked to see whether the vehicle has entered the lane changing permitted section (step ST6*m*). When it is determined in this step ST6*m* that the vehicle has not entered the lane changing permitted section, the navigation device enters a standby state in which the navigation device repeatedly carries out the process of step ST6*m*. When it is determined that the vehicle has entered the lane changing permitted section in the standby state in which the navigation device repeatedly carries out the process of step ST6*m*, the navigation device provides guidance on exit from the HOV lane (step ST7*m*). In this case, for example, the navigation device provides guidance indicating "Now is the best time to exit the HOV lane."

Guidance indicating an inquiry about whether the user has exited the HOV lane is then provided (step ST8*m*). More specifically, a guidance time adjusting unit 39 adjusts a guidance time when the navigation device provides the guidance from pieces of HOV lane related information acquired from an HOV lane determining unit 35 and an HOV lane entrance and exit extracting unit 36, and, when determining that the guidance time has come, sends guidance time data to a display processing unit 40 and to a voice message generating unit 41. The display processing unit 40 generates display data for displaying information indicating "Have you exited the HOV lane?" according to the guidance time data sent thereto from the guidance time adjusting unit 39 and sends the display data to a display control unit 24 disposed in a control unit 19. As a result, a guide map display or a telop display showing "Have you exited the HOV lane?" is shown on a display unit 17.

Further, the voice message generating unit 41 generates a voice message for providing the following information "Have you exited the HOV lane?" according to the guidance time data sent thereto from the guidance time adjusting unit 39, and sends the voice message to a voice guidance unit 42 as voice data. The voice guidance unit 42 converts the voice data sent thereto from the voice message generating unit 41 into a voice signal, and sends this voice signal to a sound output unit 18. As a result, voice guidance corresponding to the following voice message "Have you exited the HOV lane?" is outputted from the sound output unit 18.

It is then checked to see whether a setting showing that the user has exited the HOV lane has been made (step ST9*m*). More specifically, when receiving an operation signal sent thereto from an input unit 11, a control part 30 of the control unit 19 checks to see whether this operation signal shows that a setting showing that the user has exited the HOV has been made. When it is determined in this step ST9*m* that no setting showing that the user has exited the HOV has been made, the navigation device returns the sequence to step ST5*m* and then repeatedly carries out the above-mentioned processes. In contrast, when it is determined in step ST9*m* that a setting showing that the user has exited the HOV has been made, the navigation device ends the guiding process. The guidance indicating "Have you exited the HOV lane?" can be provided by using at least one of a guide map display, a telop display, and voice guidance. After the user makes a setting showing that the user has exited the HOV lane after the control part 30 has provided the guidance on exit from the HOV lane in this way, the control part prevents the guidance on exit from the HOV from being repeatedly provided after that.

FIG. 23 is a flow chart showing an operation at a time when the vehicle enters an HOV lane of the navigation device in accordance with Embodiment 14, focusing on a guiding process. Hereafter, steps in each of which the same process in a corresponding step shown in the flow chart of FIG. 12 is carried out are designated by the same reference characters as those shown in FIG. 12, and the explanation of the steps will be simplified.

When the guiding process is started, map data are acquired first (step ST1). Vehicle position information is then acquired (step ST2). It is then checked to see whether or not the vehicle is traveling in a normal lane of a road in which an HOV lane is running parallel with the normal lane (step ST4*e*). When it is determined in this step ST4*e* that the vehicle is not traveling in a normal lane of the road in which an HOV lane is running parallel with the normal lane, the navigation device ends the guiding process. In contrast, when it is determined in step ST4*e* that the vehicle is traveling in a normal lane of the road in which an HOV lane is running parallel with the normal lane, it is then checked to see whether there exists a lane changing permitted section in which the vehicle is permitted to make a lane change between a normal lane and the HOV lane ahead of the vehicle (step ST5*n*). When it is determined in this step ST5*n* that there exists no lane changing permitted section in which the vehicle is permitted to make a lane change between a normal lane and the HOV lane ahead of the vehicle, the navigation device ends the guiding process.

In contrast, when it is determined in step ST5*n* that there exists a lane changing permitted section in which the vehicle is permitted to make a lane change between a normal lane and the HOV lane ahead of the vehicle, it is then checked to see whether the vehicle has entered the lane changing permitted section (step ST6*n*). When it is determined in this step ST6*n* that the vehicle has not entered the lane changing permitted section, the navigation enters a standby state in which the navigation repeatedly carries out the process of step ST6*n*. When it is determined that the vehicle has entered the lane changing permitted section in the standby state in which the navigation device repeatedly carries out the process of step ST6*n*, the navigation device provides guidance on entrance into the HOV lane (step ST7*n*). In this case, for example, the navigation device provides guidance indicating "Now is the best time to enter the HOV lane."

Guidance indicating an inquiry about whether the user has entered the HOV lane is then provided (step ST8*n*). More specifically, the guidance time adjusting unit 39 adjusts a guidance time when the navigation device provides the guidance from the pieces of HOV lane related information acquired from the HOV lane determining unit 35 and the HOV lane entrance and exit extracting unit 36, and, when determining that the guidance time has come, sends guidance time data to the display processing unit 40 and to the voice message generating unit 41. The display processing unit 40 generates display data for displaying information indicating "Have you entered the HOV lane?" according to the guidance time data sent thereto from the guidance time adjusting unit 39 and sends the display data to the display control unit 24 disposed in the control unit 19. As a result, a guide map display or a telop display showing "Have you entered the HOV lane?" is shown on the display unit 17.

Further, the voice message generating unit 41 generates a voice message for providing the following information "Have you entered the HOV lane?" according to the guidance time data sent thereto from the guidance time adjusting unit 39, and sends the voice message to the voice guidance unit 42 as voice data. The voice guidance unit 42 converts the voice data sent thereto from the voice message generating unit 41 into a voice signal, and sends this voice signal to the sound output unit 18. As a result, voice guidance corresponding to the following voice message "Have you entered the HOV lane?" is outputted from the sound output unit 18.

It is then checked to see whether a setting showing that the user has entered the HOV has been made (step ST9$n$). More specifically, when receiving an operation signal sent thereto from the input unit 11, the control part 30 of the control unit 19 checks to see whether this operation signal shows that a setting showing that the user has entered the HOV lane has been made. When it is determined in this step ST9$n$ that no setting showing that the user has entered the HOV lane has been made, the navigation device returns the sequence to step ST5$n$ and then repeatedly carries out the above-mentioned processes. In contrast, when it is determined in step ST9$n$ that a setting showing that the user has entered the HOV lane has been made, the navigation device ends the guiding process. The guidance indicating "Have you entered the HOV lane?" can be provided by using at least one of a guide map display, a telop display, and voice guidance. After the user makes a setting showing that the user has entered an HOV lane after the control part 30 has provided the guidance on entrance into the HOV lane in this way, the control part prevents the guidance on entrance into the HOV lane from being repeatedly provided after that.

As previously explained, in the navigation device in accordance with Embodiment 14 of the present invention, when the user has made a setting showing that the user has completed exit from or entrance into an HOV lane after the navigation device provide guidance on exit from or entrance into the HOV lane, the control part prevents the guidance on exit from or entrance into the HOV lane from being repeatedly provided after that. More specifically, when the vehicle reaches a lane changing permitted section while traveling in an HOV lane, the navigation device provide guidance on exit from the HOV lane, and, when the user makes a setting showing that the user has exited the HOV lane according to this guidance, the control part prevents not only the guidance on exit from the HOV lane but also guidance on entrance into the HOV lane from being provided. When the vehicle reaches a lane changing permitted section while traveling in a normal lane running parallel with an HOV lane, the navigation device provides guidance on entrance into the HOV lane, and, when the user makes a setting showing that the user has entered the HOV lane according to this guidance, the control part prevents not only the guidance on entrance into the HOV lane but also guidance on exit from the HOV lane from being provided. Thus, immediately after the user has exited or entered an HOV lane, the navigation device can prevent any unnecessary guidance from being repeatedly provided.

Further, in above-mentioned Embodiment 14, because guidance for inquiring whether the user has made a lane change is provided by using, for example, a telop display or the like, the navigation device can prevent meaningless guidance from being provided after the user inputs information showing that the user has exited an HOV lane in response to this guidance.

A navigation device can also be implemented by combining all of above-mentioned Embodiments 1 to 14. Further, all the numerical values including distances used in above-mentioned Embodiments 1 to 14 are examples, and can be changed to arbitrary values.

INDUSTRIAL APPLICABILITY

The present invention can be used for a vehicle-mounted navigation device which is requested to provide guidance for assisting a lane change between an HOV lane and a normal lane.

The invention claimed is:
1. A navigation device comprising:
a memory device that holds a computer program; and
a processor that executes the computer program read out from the memory device,
wherein the computer program is configured to perform a process of:
  acquiring map data in which a single link represents a plurality of lanes of a road including at least one special lane and a plurality of normal lanes, the map data being a map data in which entrance and exit between a particular special lane of the at least one special lane and one of the normal lanes which is adjacent to the particular special lane are permitted only in a predetermined permitted section;
  extracting an entrance and exit section of the road which exists ahead of a vehicle and in which the vehicle is permitted to make a lane change between the particular special lane and the adjacent normal lane on a basis of the acquired map data and position information about the vehicle;
  extracting a branch point on the at least one special lane which exists ahead of the vehicle on a basis of the acquired map data and the position information about the vehicle;
  determining a guidance time for a lane changing permitted section defined by the extracted entrance and exit section, and another guidance time for the extracted branch point, both guidance times being determined such that a guidance time during travel on the at least one special lane is later than a guidance time during travel on the normal lanes; and
  providing, at the determined guidance time, exit guidance notifying that the vehicle is permitted to exit the particular special lane onto the adjacent normal lane or entrance guidance notifying that the vehicle is permitted to enter the particular special lane from the adjacent normal lane, or branch guidance on the branch point on the at least one special lane.

2. The navigation device according to claim 1, wherein the process executed by the processor further includes, when the vehicle is traveling in the special lane, setting a number of times that said navigation device provides the guidance to be less than that when the vehicle is traveling in the normal lane.

3. A navigation device comprising:
a memory device that holds a computer program; and
a processor that executes the computer program read out from the memory device,
wherein the computer program is configured to perform a process of:

acquiring map data in which a single link represents a plurality of lanes of a road including at least one special lane and a plurality of normal lanes, the map data being a map data in which entrance and exit between a particular special lane of the at least one special lane and one of the normal lanes which is adjacent to the particular special lane are permitted only in a predetermined permitted section;

extracting an entrance and exit section which exists ahead of a vehicle and in which the vehicle is permitted to make a lane change between the particular special lane and the adjacent normal lane on a basis of the acquired map data and position information about the vehicle;

extracting a branch point on the at least one special lane which exists ahead of the vehicle on a basis of the acquired map data and the position information about the vehicle;

detecting a sign related to a special lane existing forwardly;

determining a guidance time for a lane changing permitted section defined by the extracted entrance and exit section, and another guidance time for the extracted branch point according to a position of the detected sign or a distance to an exit displayed on said sign; and providing, at the determined guidance time, exit guidance notifying that the vehicle is permitted to exit the particular special lane onto the adjacent normal lane or entrance guidance notifying that the vehicle is permitted to enter the particular special lane from the adjacent normal lane, or branch guidance on the branch point on the at least one special lane.

4. The navigation device according to claim 3, wherein the process executed by the processor further includes determining the guidance time on a basis of the position of the sign included in the acquired map data.

5. The navigation device according to claim 3, further comprising a forwardly-existing sign detecting camera for capturing an image of a sign existing forwardly,
wherein the process executed by the processor further includes detecting the position of the sign on a basis of the image captured by said forwardly-existing sign detecting camera.

6. The navigation device according to claim 3, wherein the process executed by the processor further includes determining, on a basis of a rule governing a position where a sign is placed in advance, the position of the sign, and determining the guidance time according to this determined position of the sign.

7. A navigation device comprising:
a memory device that holds a computer program; and
a processor that executes the computer program read out from the memory device,
wherein the computer program is configured to perform a process of:
acquiring map data in which a single link represents a plurality of lanes of a road including at least one special lane and a plurality of normal lanes, the map data being a map data in which entrance and exit between a particular special lane of the at least one special lane and one of the normal lanes which is adjacent to the particular special lane are permitted only in a predetermined permitted section;

extracting an entrance and exit section which exists ahead of a vehicle and in which the vehicle is permitted to make a lane change between the particular special lane and the adjacent normal lane on a basis of the acquired map data and position information about the vehicle;

determining a guidance time for a start point of a lane changing permitted section defined by the extracted entrance and exit section; and providing, at the determined guidance time during travel on the special lane, information about an exit of a highway which exists forwardly and which the vehicle will reach after exiting the particular special lane onto the adjacent normal lane by using at least one of a textual display, a beep sound, a guide map, and a voice indicating a street name.

8. The navigation device according to claim 7, wherein the process executed by the processor further includes providing the information about an exit of a highway which exists forwardly and which the vehicle will reach after exiting the special lane either on a basis of information registered in the acquired map data or by forwardly tracing links shown by the acquired map data.

9. The navigation device according to claim 7, wherein the process executed by the processor further includes providing the information about an exit of a highway which exists forwardly and which the vehicle will reach after exiting the particular special lane on a basis of information on a detected sign.

* * * * *